United States Patent
Fagan

(10) Patent No.: US 11,065,708 B2
(45) Date of Patent: Jul. 20, 2021

(54) METHODS AND SYSTEMS FOR PLASMA MACHINE PROCESSING OF STEEL BEAMS AND OTHER LONG PRODUCTS USING A PANTOGRAPH PLATE BEVELLING GANTRY-TYPE PLASMA CUTTING MACHINE

(71) Applicant: Matthew Fagan, Middle Park (AU)

(72) Inventor: Matthew Fagan, Middle Park (AU)

(*) Notice: Subject to any disclaimer, the term of this patent is extended or adjusted under 35 U.S.C. 154(b) by 0 days.

(21) Appl. No.: 16/582,475

(22) Filed: Sep. 25, 2019

(65) Prior Publication Data

US 2020/0016678 A1    Jan. 16, 2020

Related U.S. Application Data

(63) Continuation-in-part of application No. 14/182,056, filed on Feb. 17, 2014, now Pat. No. 10,871,758.

(Continued)

(51) Int. Cl.
  *B23K 10/00* (2006.01)
  *B23K 37/02* (2006.01)
  *G05B 19/18* (2006.01)

(52) U.S. Cl.
  CPC ........ *B23K 10/006* (2013.01); *B23K 37/0258* (2013.01); *B23K 37/0288* (2013.01);
  (Continued)

(58) Field of Classification Search
  CPC ...... B23K 26/38; B23K 10/00; B23K 10/006; B23K 37/0258; B23K 37/0288; B23K 37/0235; B23K 37/0241; B23K 2201/28
  (Continued)

(56) References Cited

U.S. PATENT DOCUMENTS 4,466,069 A    8/1984  Balfanz
5,597,498 A    1/1997  Sunayama et al.
(Continued)

FOREIGN PATENT DOCUMENTS

CN    2691773 Y    4/2005
EP    0696491 A1    2/1996
(Continued)

OTHER PUBLICATIONS

Ocean Machinery. (Dec. 11, 2008). Beam Cut to Length with CNC Beam Coping Machine [Video file]. Retrieved from https://www.youtube.com/watch?v=kGYIAuiUgso, 2 pages.

(Continued)

*Primary Examiner* — Tu B Hoang
*Assistant Examiner* — Alba T Rosario-Aponte
(74) *Attorney, Agent, or Firm* — Lathrop GPM LLP

(57) ABSTRACT

A plasma-torch cutting machine gantry moves in a first axis and the torch mounted through a pantograph to a drive box moves along the gantry in a second axis. The drive box rotates the torch about a third axis, and tilts the torch about a fourth axis. The drive box moves vertically in a fifth axis. The torch is mountable with tip at pantograph focal point or in an extended position. A controller firmware computes and apply offsets in the first, second and fifth axis to maintain the plasma torch tip in desired position despite the torch being mounted in extended position, rotation and tilt of the torch. In embodiments the torch is rotatable −/+90 degrees from vertical; and a laser scanner maps surfaces and edges of beams to determine movements and rotations for cutting beams.

12 Claims, 19 Drawing Sheets

Related U.S. Application Data

(60) Provisional application No. 61/765,553, filed on Feb. 15, 2013.

(52) U.S. Cl.
CPC .. *G05B 19/182* (2013.01); *G05B 2219/40293* (2013.01); *G05B 2219/45044* (2013.01)

(58) Field of Classification Search
USPC ............ 219/121.39, 121.69, 121.44, 121.41, 219/121.59, 121.42
See application file for complete search history.

(56) References Cited

U.S. PATENT DOCUMENTS

| | | | |
|---|---|---|---|
| 5,729,345 | A | 3/1998 | Ludewig et al. |
| 6,201,207 | B1 | 3/2001 | Maruyama et al. |
| 6,772,040 | B1 | 8/2004 | Picard et al. |
| 7,071,441 | B1 | 7/2006 | Bulle |
| 7,469,620 | B2 | 12/2008 | Fagan |
| 8,683,841 | B1 | 4/2014 | Walsh |
| 8,865,056 | B2 | 10/2014 | Fagan |
| 8,987,636 | B2 | 3/2015 | Fagan |
| 9,539,664 | B2 | 1/2017 | Fagan |
| 9,952,581 | B2 | 4/2018 | Fagan |
| 2008/0185368 | A1 | 8/2008 | Fagan |
| 2009/0071944 | A1 | 3/2009 | Forlong |
| 2009/0250445 | A1* | 10/2009 | Yamaguchi .......... G05B 19/404 219/121.72 |
| 2009/0312862 | A1* | 12/2009 | Fagan ................. B23K 10/006 700/160 |
| 2010/0155377 | A1 | 6/2010 | Lindsay et al. |
| 2010/0301020 | A1* | 12/2010 | Phillip ................. B23K 26/38 219/121.44 |
| 2010/0314361 | A1* | 12/2010 | Buccella ................ B23K 10/00 219/121.39 |
| 2011/0316977 | A1* | 12/2011 | Pienaar .............. G05B 19/4068 348/46 |
| 2012/0242015 | A1 | 9/2012 | Fagan |
| 2012/0298633 | A1* | 11/2012 | Riemann ............ B23K 37/0241 219/121.44 |
| 2014/0113527 | A1 | 4/2014 | Lindsay et al. |
| 2014/0180465 | A1 | 6/2014 | Nakano et al. |
| 2014/0236339 | A1 | 8/2014 | Fagan |
| 2015/0088800 | A1 | 3/2015 | Kazachkov et al. |

FOREIGN PATENT DOCUMENTS

| | | |
|---|---|---|
| EP | 2135701 A2 | 12/2009 |
| EP | 1620223 B1 | 8/2010 |
| WO | WO 2004087362 | 10/2004 |
| WO | WO 2012127319 A1 | 9/2012 |

OTHER PUBLICATIONS

First Office Action dated Nov. 28, 2016 for Chinese Patent Application No. 201480020672.7 (including partial English translation); 13 pages.

Second Office Action dated Jul. 13, 2017 for Chinese Patent Application No. 201480020672.7 (including partial English translation); 5 pages.

European Patent Application No. 14752133.0; Extended European Search Report dated Dec. 16, 2016; 8 pages.

Fagan et al., Plasma Beveling Technology Offers Precise Plate Weld Preparation, Welding Journal, Feb. 2011, 4 pages.

PCT/IB2014/000753 International Search Report and Written Opinion dated Sep. 26, 2014, 17 pages.

European Patent Application No. 16173905.7 extended European search report, dated Sep. 28, 2016, 9 pages.

\* cited by examiner

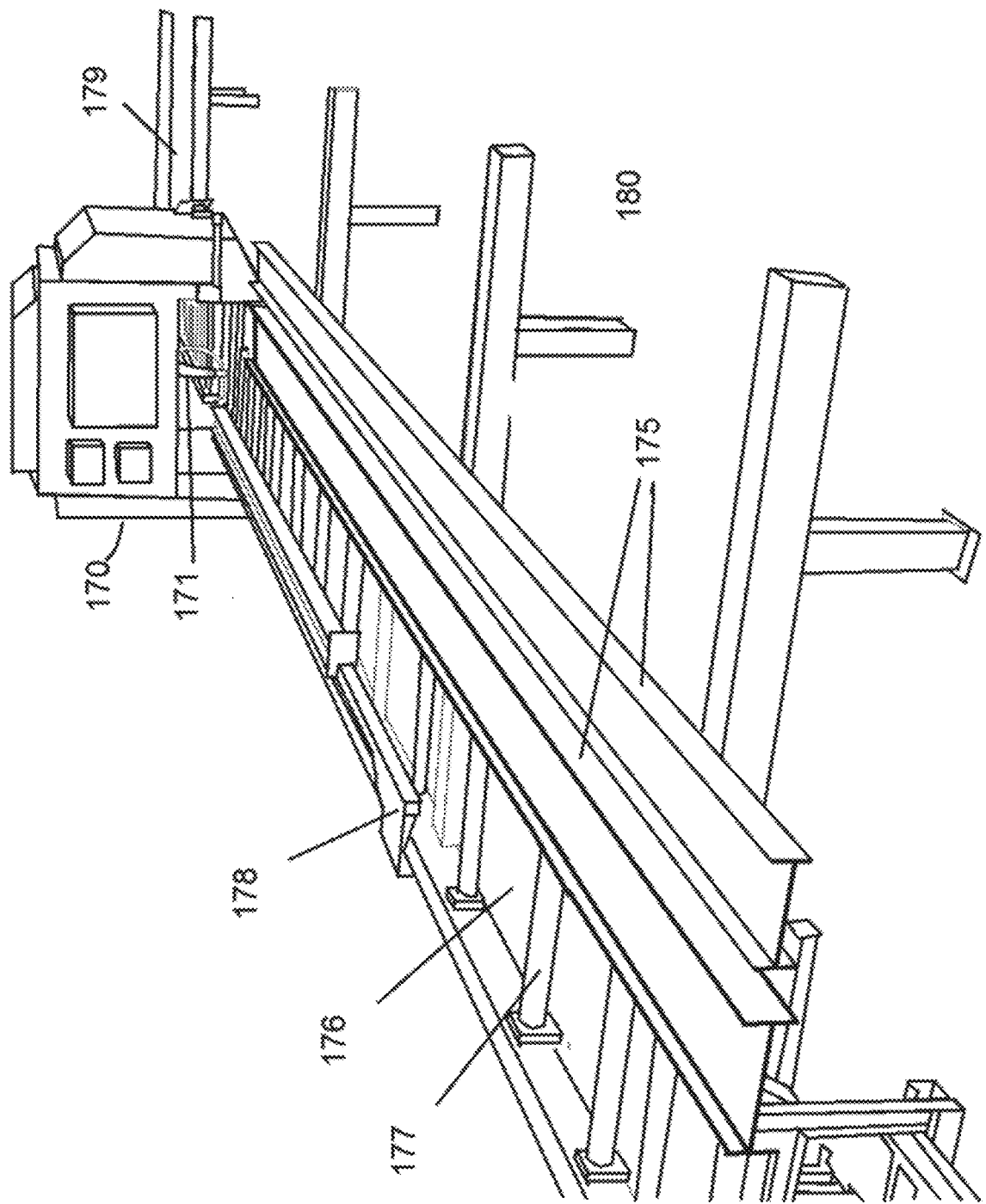

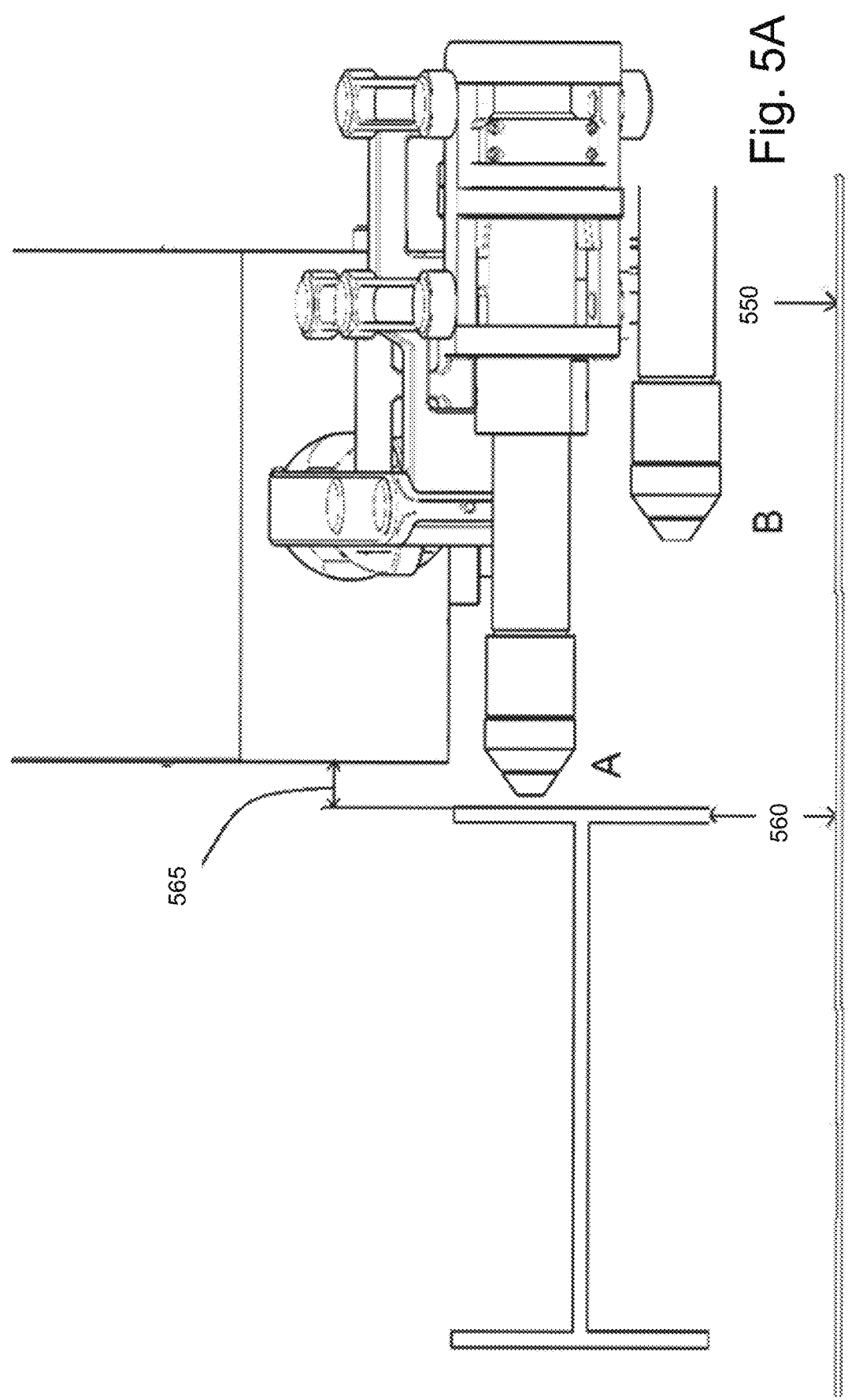

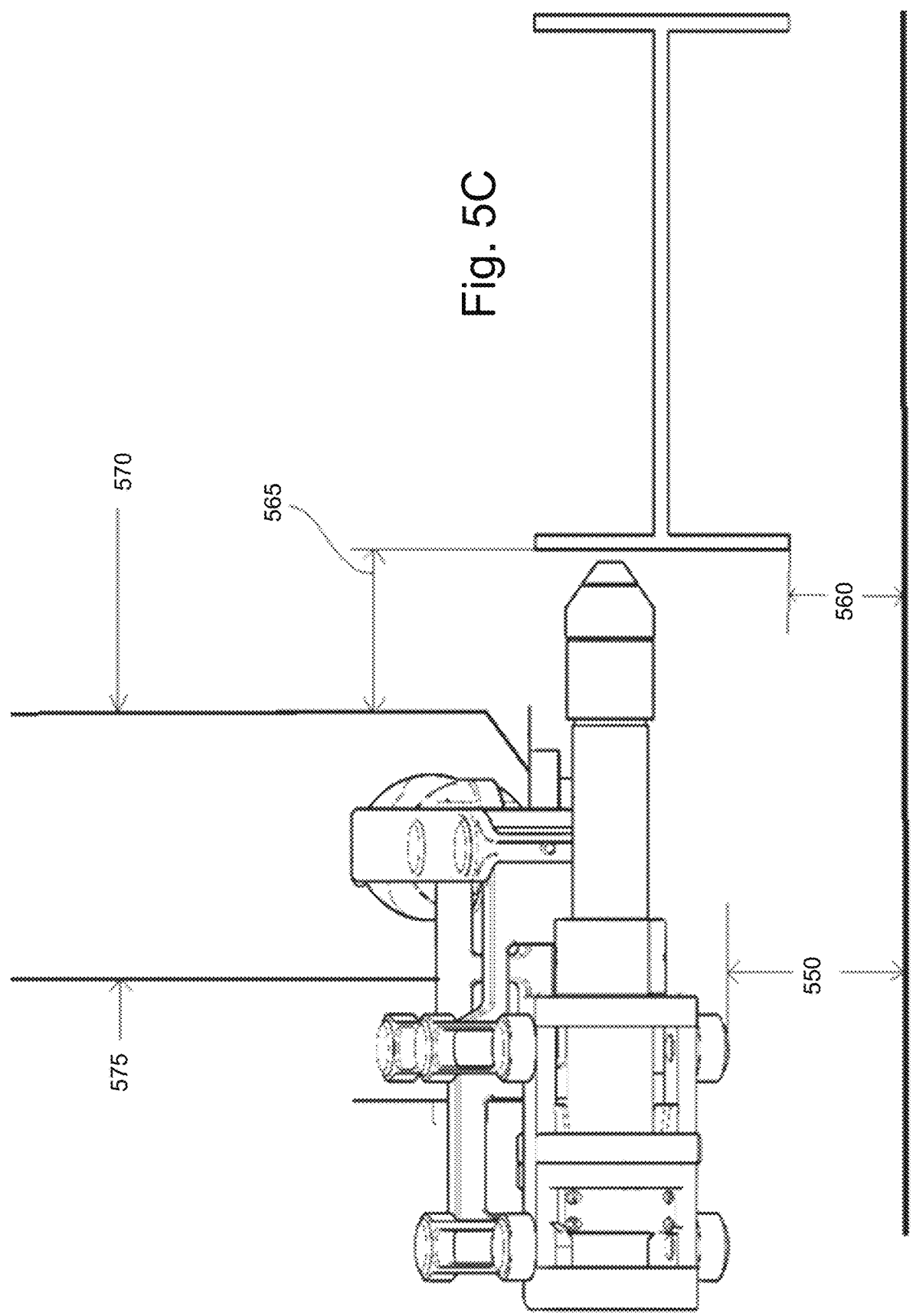

[Results-x]

Y Line Scan Spaced in X Axis

METHODS AND SYSTEMS FOR PLASMA MACHINE PROCESSING OF STEEL BEAMS AND OTHER LONG PRODUCTS USING A PANTOGRAPH PLATE BEVELLING GANTRY-TYPE PLASMA CUTTING MACHINE

RELATED APPLICATIONS

The present application claims priority from, and is a continuation in part of, U.S. patent application Ser. No. 14/182,056 filed 17 Feb. 2014. Patent application Ser. No. 14/182,056 in turn claims priority from U.S. Provisional Patent Application 61/765,553 filed 15 Feb. 2013. The material herein is related to the subject matter of U.S. Pat. Nos. 9,952,581, 9,539,664, 8,987,636, and 8,865,056, all to the inventor of the present application. Each of the above applications and patents is incorporated herein by reference in its entirety.

FIELD

The present document relates to the field of processing metallic "Long Products," such as I and H beams used for steel construction, railroad rail, rolled angle-iron and hollow-section products. While long products typically have nominally constant cross section down the length, variations in shape and dimensions are significant to processing long products.

BACKGROUND

Glossary

Beam. The term Beam will be used to represent all Long Product of constant cross section including but not limited to the cross sections in FIG. 2. In practice the word Beam refers to structural I beam or H beams, item 200.

Beamline This refers to historical machines which process such beams. Designs vary greatly and a given beamline installation can refer generally to a line of rollers along which beams move through three processing stations in sequence. Typically, the sequence includes first a saw then a multi axis drill and then a coping machine to cut flanges and penetrations and perhaps perform hard stamping. The relatively recent robotic plasma Python-X shown in FIG. 1B. has only one such station and a single floor mounted robot which performs all such tasks. Conceptually it retains the line and workstation approach.

Python-X Now a brand name of Lincoln Electric, this was the first of a new generation of robotic plasma beamline machines built by Burlington Automation as shown in FIG. 1B. It replaces the three drills with a robotic plasma torch which cuts bolt holes. The plasma torch also severs the beams, performing the function of a saw. It can also cope the flanges; Plasma marking is possible.

The term Python-X is used to refer to what is now family of very similar machines, all based on the original workcell concept but performing all the tasks of sawing, drilling, coping, marking for moving, incoming, beams on rollers.

Long Product

Ignoring steel type, long product cross sections are very varied and distinct from steel plates which only have one cross section and varies in width and thickness. Directly from the mill, long product and plate are potentially infinite in length but are made in stock lengths.

Plate steel is of accurate and constant thickness and for which stock plate edges are rarely significant in fabrication as they are never used. Holes may be drilled in one surface of a plate.

Typically, holes are drilled in three of the surfaces of a H beam, two flanges and the web, or in two surfaces of angle stock. Unlike plate processing, the exact position of these holes cannot be determined until drilling as the exact positions are determined variously by distance from the web or flanges or centreline and this is significantly variable with manufacturing tolerances, even along the length of a single beam. These specifications are related to an idealized cross section.

This variability precludes traditional NC programming as the requirements must be given to the machine, not the actual coordinates of the holes to be drilled. The control unit must measure everything and determine the precise positions from those measurements. This is not a function on most NC controls in the marketplace for plate processing. They all work on external NC controls and lack even the ability to perform the essential measurements. Most plasma machines do not have a programmable Z axis and most existing NC control systems are incapable of driving the Z axis, let alone do so synchronously. Almost all rely on an independent height control in the Z axis, typically a height control that senses arc voltage. Where the major deformity in plate is in bending, not thickness, deformities of hot rolled long product are as many as the surfaces including longitudinal bends, twists and thickness variations. Long product is more difficult to process than plate as these surface variations occur in all directions. Solving these problems in order to drill and weld prepare long product prior to assembly is the object of this invention.

Long Products are Distinct from Plate.

Plate usually has an accurate thickness and is delivered in rectangles of various sizes. There is only one nominally flat surface to be cut on a plate and the edges of stock plates are insignificant because most plates are delivered slightly oversize. Individual shapes are cut from plates, usually many shapes on each plate in patterns known as a nest. NC cutting of plate is a 2-dimensional exercise. Weld preparation of cut edges on plates may require additional tilting a torch to bevel one or more edges while cutting along these 2-dimensional paths.

In contrast, there are many surfaces to most Long Products. Some long product is curved as in pipe or with curved corners between flat surfaces. Dimensions are specified parametrically as in FIG. 9(a) and sizes vary from mill to mill and from one end of the long product to the other because they are hot rolled.

Beams and similar long product are fundamentally different from plate as they typically need only be cut to length and appropriate holes formed. Processing long product includes largely drilling holes for bolts, rivets, and similar fasteners. Unlike plate, weld preparation for assembly is rare. There may be other holes called penetrations added, and slots plus marking. Trimming and shaping flanges and ends to avoid collisions at joints as beams are assembled is called coping. Otherwise there is no shape cutting, as is common with plate, as each beam profile is already shaped for a purpose. NC programming of shapes and nests of shapes, fundamental for plate processing, is irrelevant for beams.

Consequentially, the machines ordinarily used to process large plates and long products are typically very different physically and how they are controlled by computers. Compare the physical layouts shown in FIG. 1A and FIG. 1B.

For beam processing, traditional XY programs are not used as the final path is calculated after the beam is examined. Beam NC is about specifying what is required and applying desired hole patterns to each beam allowing for variations, each beam can be slightly different, twisted, warped, bent and oversize or varying in thickness, even along its length. Beams are cut one at a time. Such simple end to end nesting as is performed is better termed concatenation.

Examples of long product sections are shown in FIG. 2, and include a variety of shapes typically formed by hot-rolling steel or extruding aluminum. These shapes include traditional I beams (210), Channel (215), Equal Angle (220), Unequal angle (230), Rolled Hollow Section (RHS, 240), flat bar (250), T section (270), round merchant bar (290), steel rail (295) and Purlins (294), and many more not shown. For example, ARMCO (293) is a proprietary long product made from rolling steel strip. It has the same characteristics of having a constant cross section down its length. Bulb Flat (or Holland plate) (280) is a special type of half T section (270) used extensively in shipbuilding because it is half of the weight of T section (270) for comparable strength. There are specialty NC machines to process every type of material shown and some of these machines are very large and complex at a cost of more than $1 Million. Such machines often only process only one section shape, being unable to adapt to other shapes.

Each type of long product may also include many variations as expressed parametrically (see FIGS. 9(*a*), 9(*b*), 9(*c*)). Processing of long products always involves cutting and often drilling. Weld preparation of long product edges is rare.

Round closed products like tube (260) and Rolled Hollow Section (240) (Flattened tube) may be processed with special purpose plasma machines generally using lathe-like gripping chucks to rotate the tube under the plasma.

In beam processing, beams are generally cut to length and drilled. A circular saw or band saw may be used to cut the beams either before or after drilling. Very large drills may also be used to put in bolt holes for assembly of a structure.

In the conventional process, a skilled layout tradesperson, working from printed drawings, first marks all the bolt hole positions. This would take an hour of the tradesperson's time. The holes would then be drilled and a variety of semi-automatic drills and saws may be used.

Variations for special purpose drills include but are not limited to a "beam line" drill, an "angle line," a "plate line" with drilling head, a "flat bar burner". The word 'line' is a reference to 'production line' as the very heavy beams are often moved along rollers between workstations.

Add on processes for such machines may include an oxy torch "coper" to shape the ends, a marking machine to indicate points along the beam, and a "hard stamper" to punch lettering deep into the steel to identify the beam.

Saws may vary greatly in size, cost and power. A large saw will have a diameter around one meter. Clamping is a big issue as are oil cooling, swarf removal, and speed. Some saws only cut square to the beam and cannot be rotated. Others known as miter saws can cut at an angle, the angle is called a "miter". However, these saws can only miter in one direction from a square cut, so if the reverse direction miter is required, the beam must be rotated before entering the saw.

Beam lines can realize a dramatic increase in productivity by eliminating the time and resources required to mark the beams and long products, the excess handling time required to switch between drill and saw, as well as the considerable costs experienced to correct for human error. A single hole in the wrong position, or a miter upside down, can turn a very expensive beam into scrap. However, these productivity improvements come at a very high cost when you consider that the job can be done with simpler tools. Often the purchase of automatic systems is driven more by time than by cost.

The largest and most expensive conventional automatic machines for cutting and drilling beams are called beamlines. Such very large factory sized machines typically move very heavy long and large beams around a factory on elevated roller conveyors and then feed the beams into a saw and then into a drill and then into a coper to trim the flanges. Such systems cover a lot of area and are utilized only for very high volumes of repetition cutting for large steel structures. They are impossible to justify for small workshops and fabricators for jobs that can be done manually at little cost.

The wide range of cross sections possible for long product, such as those shown in FIG. 2 has resulted in many different, and often incompatible, specialist automatic machines from a limited number of international manufacturers including Peddinghaus, Wagner, Fichep, Daito, and others. Less expensive, dedicated, machines are often capable of processing only one section type, such as angle line 220, 230, or "flat bar burner" for section 250 for cutting and drilling small connection plates from flat bar of just the right width.

In perspective, the Empire State building was constructed in 13 months and used 600,000 tons of structural beams and columns. This was done entirely without computers or automation but with a massive workforce. The connections were made with drilled holes and rivets, not bolts. Welding was not used.

The 20th century saw little change except for the advent of Numerical Control (NC) in the early 1970s.

As each shape is different, these were each treated as different problems. Unlike plate cutting where all plates are identical single flat surfaces, there is no generally accepted or standard NC programming language for multifaceted beams and basically every machine was different, even from the same manufacturer.

Individual beam line drills, for example, have up to 12 separate programmable axes in three directions, and the physical layout of drills, stops, clamps, probes change endlessly, making NC programming particularly onerous. The combination of PLC (Programmable Logic Controllers) and hydraulics, clamps, stops, limit switches, slides, grippers, moving and stationary rollers, measuring rollers and multiple axes means that these big machines are extremely complex and no two the same.

Plate, milling and lathe NC programming as defined in EIA RS-274D cannot be used as the actual sizes of the beam varies too much even along the length of a single beam. The NC machines each had their own proprietary language which specified parametrically what had to be done, and it was up to the software to measure each beam at many points and translate that into precision positions for drilled holes, duplicating the work of the skilled tradesman. Sensing probes were universal in checking distances such as the height of the beam, the width of the flanges and the center line of the web. Programming these machines was difficult.

At the same time, demand for functionality has grown, and more processing functions have been added to machines that essentially began as large and powerful multi axis drills. Plasma or oxy torches have been added for coping, penetrations, cutouts, beam splitting, and other specialist applications. Each added function however added its own practical problems and each was implemented differently from machine to machine, adding to programming complexity.

While the ultimate productivity of these many specialist machines for large volumes in highly repetitious, multi-story buildings, was enough to justify the very high price of these machines, many countries still cannot afford the expense and resources required to purchase and install such machines, especially countries where cost of wages for drilling and sawing is low. The number of beam processing machines in production around the world is very low, far less than 1% of the population of NC plate processing machines.

Due to the wide variation in function and layout, each large machine requires unique programming software to match its functionality. This software was written by the manufacturer for each machine. Such software, however, has conventionally experienced only a short lifespan and lacked support. While the machines themselves have a practical service lifespan measured in decades due to their extremely heavy construction, the software to operate such machines becomes unsupported, especially in a rapidly changing world of computers.

Until 2005, flame cutters could not be used to cut bolt holes because of concerns about the heat affected zone around the burned hole. Heat affects the metallurgy of the beam. Flame cut holes were not to be used. This was because pierce times for oxy-acetylene cutting took minutes compared with seconds with plasma. Plasma however made a terrible hole. Thus, drilling was still mandatory and drills use great force and therefore rigid, large, heavy, and expensive machines weighing perhaps 30 tons have been required. The beams themselves are also very heavy, steel being 70% of the weight of lead and 3× heavier than concrete. It also bends under its own weight, changing geometry.

A significant development was in refinement of plasma torch cutting which improved dramatically in quality in tight competition with laser cutting. The result was that in 2005 the American Institute of Steel Construction AISC Specification Section M25 announced that plasma cutting was now approved for making bolt holes as a direct consequence of advances in plasma technology. For example, the plasma hole slant had dropped to under 4 degrees of slant and the improved smoothness was substantially better than the minimum required by the standard at 3 mm. This meant an acceptable bolt hole could be cut in heavy girders in seconds, not minutes as with traditional drills. Also with computer control, holes could be of any size and shape and cut without touching the beam, so without vibration and high resistive forces. This can lower the weight and cost of the machine dramatically.

At least one company has manufactured machines to use plasma to cut bolt holes These machines look and work much like the traditional beamline concept where beams are fed in a line or rollers through a work cell and processed fully with a plasma torch One such example is the "Python-X" by Burlington Automation. The Python-X uses a large industrial 6-axis robot arm to hold a modern high definition 260-amp plasma torch, which can perform many functions previously performed by different tools.

The company says the Python-X replaced up to seven separate machines and its single plasma torch can make holes of many diameters, while also able to saw, cope, hard stamp, mark lines, cut small attachments, and add bevels and weld preparation According to promotional material, the Python-X uses twenty percent of the floor space of a typical beamline drill and saw, needs twenty percent of the processing time, and costs twenty percent as much, and produces high quality bolt holes approved for structural joints by AISC (American Institute of Steel Construction)

The Python X machine is a logical development of traditional beamline drills with a work center concept which suits the fixed robot and a system which pushes or pulls the beam through for processing. While this machine contains many innovations and the development of the machine has proven that plasma torches can correctly sever, shape, drill, and mark long steel product, there are serious limitations which remain from the beam line approach where a beam is fed into the stationary machine in steps for processing. On the other hand, the work centre contains many rollers, hydraulic clamps and a high accuracy section which can deform and align and position each section of the beam in a known geometry, reducing errors from distortions like camber, bends, and twists.

The Python-X is NC programmable using DSTV files, it eliminates manual layout, saving perhaps one hour of skilled labor per beam and reducing risk of human error.

To summarize, the beam lines were huge production lines occupying whole factories and designed for mass production of multistory steel buildings. A complete installation costs in the order of $8 Million. The Python-X offers a big drop in total area and cost, estimated at 80% in floor space by incorporation of all three traditional stations, sawing, drilling, coping and marking in a single workstation.

The Python-X is very expensive and takes a lot of area compared to a plate processing machine. The business justification is unchanged. To buy an NC machines to eliminate cheap sawing and drilling requires the job have high quantities or a short delivery time, wages for skilled tradesmen must be high, or there is a shortage of tradesmen.

The volume argument means multiple heavy beams still travel around the factory on rollers and through a work cell. It also means a lot of cost in floor space, rollers, hydraulics, switches, electronics, hydraulic logic and installation. It costs most of $1 Million to buy and install with a similar cost in factory floor space. Even a short machine has a beam loading table where the beams are moved sideways onto the rollers and an unloading side where they are removed. There is a robotic enclosed workcell in the center. The Python X gives big savings against a drill line but conceptually it remains the same.

Preserving the work cell concept means the Python X must be at least twice the length of the longest beam. Then as rollers are needed, they must be powered or hydraulics must be provided to push the beam. Then as the beam is supported on rollers, it moves around and has bends and twists, so the work cell needs strong hydraulic clamps in the work cell to locate, straighten, align and even deform the beam to minimize errors.

Then to cut to the bottom of the beam for sawing, the rollers need to be removed, so 3 or 4 of the rollers must drop down in front of the robot, presenting the robot with a projecting end which can be robotically processed on all sides.

This dropping section raises problems when the beam end must pass through the robotic work cell and it is necessary to work on the other end of the beam. More and different clamps and detectors are needed. You even need clamps to stop tipping as short beams can tip if not fully supported.

What this means is that while the Python-X reduces the cost and area dramatically, it is still a very large, complex and therefore expensive machine with many moving parts, switches and special control software. Adjustable rollers and hydraulic clamps also need programmability to force the beam into a fixed position and to clamp it and so make it straight as much as possible.

The Python-X layout is shown diagrammatically in FIG. 1B. It has rollers 177 on both input and output. As there are not additional workstations as in a traditional beamline, there are side loading and unloading areas for beams on input (180) and output (179) rather than the traditional long rollers which snake around a factory. This is a big saving in area against multi station traditional beam line drills.

The beam travels along the rollers, pushed by a powered arm (178) into the workcell area (170) in which cabinet with door there is a floor mounted six axis industrial robot holding large plasma torch (171). This combination is capable of sawing, drilling (by way of plasma cut holes), plasma marking and trimming flanges and the web known as coping.

The Python-X is a high production machine intended to process many beams like the two beams marked 175 from the loading area, onto the rollers and through the machine and when finished, offloaded sideways at delivery area 179.

SUMMARY

This document expands its parent application with more detail of the individual innovations and improved design for a gantry mounted plasma processor for long steel product. A plasma-torch cutting machine has a gantry movable in a first axis, a plasma torch mounted through a pantograph to a drive box movable along the gantry in a second axis perpendicular to the first axis. The drive box rotates the torch about a third axis, tilts the torch about a fourth or tilt axis. The drive box moves vertically in a fifth axis. The torch is mountable with tip at a focal point of the pantograph or in an extended position. A controller has firmware adapted to compute and apply offsets in the first, second and fifth axis to maintain the tip of the plasma torch in desired position despite the torch being mounted in extended position, rotation of the torch in the third axis, and tilt of the torch in the fourth axis. In embodiments the torch is rotatable − and +90 degrees from vertical; and a laser scanner 301 (FIG. 3) prepares an electronic map of surfaces and edges of beams to determine movements and rotations needed to cut beams.

A conversion kit for converting a pantograph-type bevel-head plasma-torch cutting machine to cut an unclamped beam includes a torch holder adapted to be mounted on a pantograph of the cutting machine, the torch holder adapted to hold the plasma torch in a first position with a tip of the plasma torch extended beyond a focal point of the pantograph and in a second position with the tip of the plasma torch at a focal point of the pantograph; a laser-mapper adapted to prepare a map of surfaces of an unclamped beam when mounted to a drive box of the pantograph bevel-head plasma-torch cutting machine; and a controller has firmware adapted to compute offsets in a first, second and third axis as required to position the tip of the plasma torch in a desired position despite the torch being mounted in the extended position and rotation of the torch, the controller configured by firmware to use the map of surfaces of the unclamped beams to control height of the plasma torch independent of arc voltage. In embodiments, the controller is configured to compare the map of surfaces of the unclamped beam with nominal dimensions of a selected beam and to generate an error if the map of surfaces of the unclamped beam differs significantly from the nominal dimensions of the selected beam; and to combine the scanned shape with a nominal shape of the unclamped beam and desired cuts to create numerical control program specific to cutting the unclamped beam as positioned on a bed of the cutting machine.

A plasma-torch cutting machine has a laser workpiece-mapping system configured to provide measurements of a workpiece to a control processor; a gantry movable by the control processor along a length of a bed of the plasma-torch cutting machine, movement of the gantry defining an X axis; a drive-mounting box coupled to and movable under command of the control processor along the gantry, movement of the drive-mounting box along the gantry defining a Y axis; and a plasma cutting torch coupled by a pantograph to the drive-mounting box, the pantograph rotatable about a rotation axis perpendicular to the Y axis and tiltable in a tilt axis perpendicular to the rotation axis, the pantograph configured such that with the plasma cutting torch attached to the pantograph in a first position a tip of the cutting torch remains at a focal point despite rotation of the plasma cutting torch in a rotation axis, and with the plasma cutting torch in the first position the tip of the cutting torch remains at the focal point despite changes of tilt. The pantograph is movable by the control processor in a Z axis perpendicular to the X and Y axes; the plasma cutting torch configured to attach to the pantograph in a second position, the second position characterized by the tip of the cutting torch being distal to the focal point and a body of the cutting torch intersecting the focal point; and the control processor has firmware adapted to compute and apply offsets in the X, Y and Z axis as required to maintain the tip of the plasma torch in desired position despite the torch being mounted in the second position, rotation of the plasma torch in the rotation axis, and tilt of the plasma torch in the tilt axis. The control processor computes the offsets as the torch is rotated in the rotation axis and tilted in the tilt axis.

BRIEF DESCRIPTION OF THE DRAWINGS

FIG. 1B illustrates a robotic plasma torch beam line processing system.

FIG. 5A showing the effect of torch extension with the original drive box and illustrates the need to change the drive box in many to avoid collisions when cutting long product.

FIG. 5C illustrates a flange of an H beam being cut by a horizontal plasma torch with the new drive box width (570) and improved clearance (565) from a vertical flange.

DETAILED DESCRIPTION OF THE EMBODIMENTS

Figure 1A:
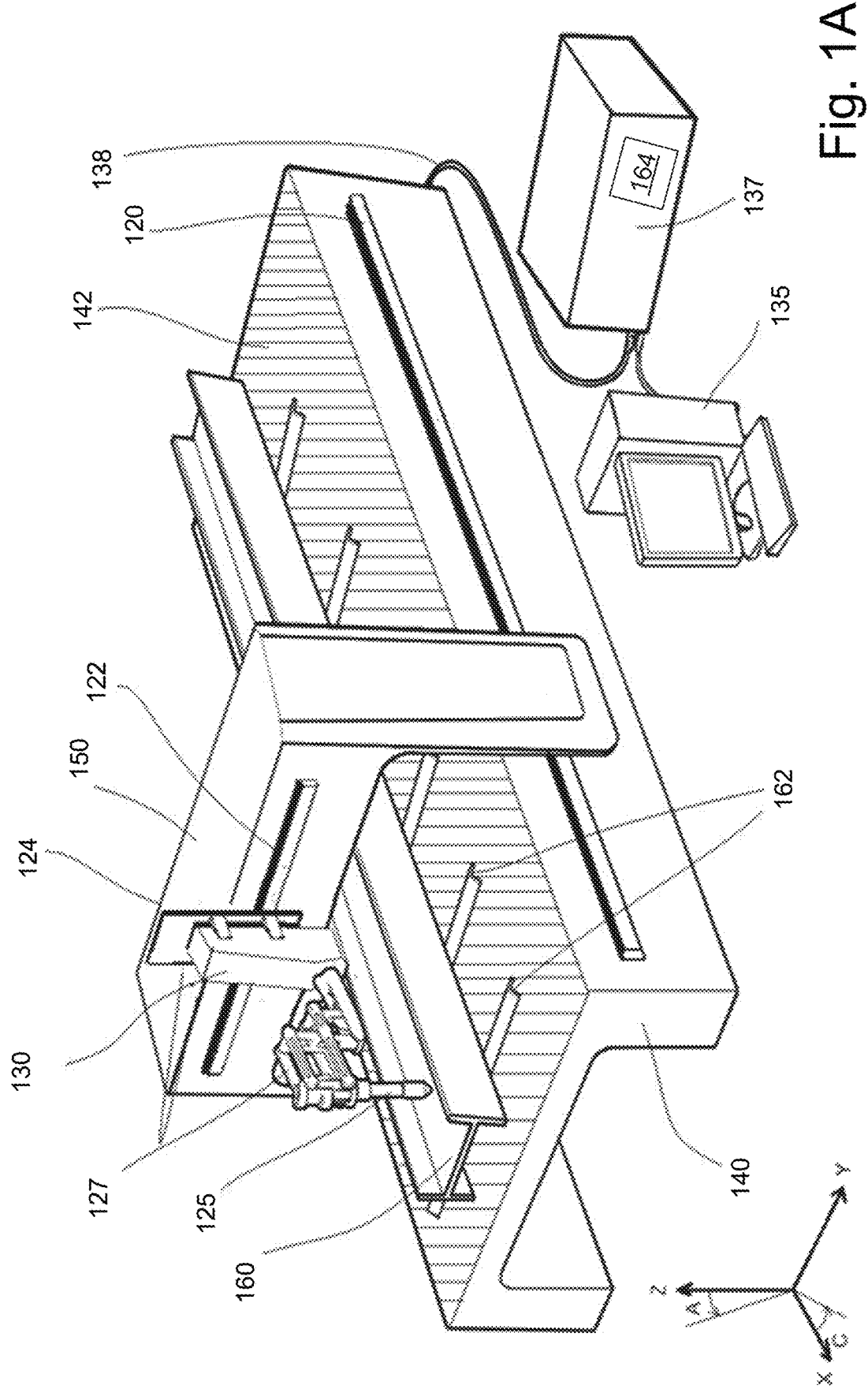
FIG. 1A illustrates a 5-axis gantry style plasma cutter processing an I beam or H beam (cross section as per FIG. 2, 210) for example, on a standard machine bed, in an embodiment.

The inventor's program FastBEAM™ as used in this invention creates a common platform for all such machines and file formats to suit all beam lines in a machine independent way and independently from the manufacturer. The proprietary FastBEAM V (FBV and FBW) formats predate the 1995 creation of the German DSTV standard (see below) but were not published. FastBEAM™ and its file formats including .FBX files are used in the invention to provide both an external programming system and internally to convert incoming files specifications such as DSTV into a fixed machine independent input. The .FBX file is used in conjunction with the catalog and the scan data results to create an individual NC program for the plasma torch for each beam to be processed.

A recent standard description language to describe long product is also known as DSTV language specification (Deutscher STahlbau Verband/German Steel Construction Association) introduced in 1998. A further version was released in 2007 which changed the computer format to a newer XML style format but has not yet found favor commercially. The intent of this file format was to describe the requirements for beams and attachment plates for the automation of processing by Numerical Controlled machines in a machine and manufacturer independent way. Strictly it is not a direct coordinate path for a machine as is common for NC languages. Rather it is a parametric specification of what holes, shapes, marks and copes are required for a given section and relative to which datum such as centerline, top flange, bottom flange. The actual machine movements cannot be determined until the specific beam is measured and the datum lines established as hot rolled product is highly variable and the positions are critical to a millimeter.

While an industry standard description language was most welcome to bring together a fragmented industry of bespoke machines without standards in programming, it did not change the fact that so many different machines were needed to process many different cross sections of long product. Another change was required to simplify the processing problem.

The invention uses a single-pantograph machine which can process both beams and plates as needed. The mechanical differences from prior plate cutting machines include allowing extension of the torch from the focal point to obtain adequate clearance, adding laser measurement devices to map the beams so hole locations can be calculated, and replacing arc-voltage sensing feedback torch-height controls with full Z-axis computer control independent of arc voltage. In particular, the invention effectively converts a common style of gantry plasma plate processor into a machine which can also process Long Products. In this machine the pantograph functions as a 3-axis robot of limited movement but is attached to a gantry allowing unlimited movement in X and Y.

There are of course long products and plate shapes which are not used in construction but are used in general fabrication. However as 60% of all steel is used in buildings, a single machine to cut both plate and beams is potentially very useful.

The technical challenge here is to convert the plate bevel-cutting machine to process beams with a completely different set of problems while retaining ability to accurately process entire plates. If this can be achieved the impact on steel processing for construction would be profound if there is little additional cost.

In addition to mechanical changes, development is required in the NC control and involves complex mathematics and an entirely novel way of mapping and cutting unclamped free-standing beams without a workcell or hydraulic clamping. Basically, in situ cutting and marking is required without touching and without clamping. The solutions require embedded real time high speed computation with complex computations which are even today not possible in majority of plate cutting NC controls with their limited 2 axis dedicated systems built for processing 2D plate programs. The Z axis is used only for height adjustment which is generally completely independent axis and not programmable.

The challenges for converting a gantry based beveling plasma gantry to also cut and drill long product are many, substantial and complex. It is not just a matter of making the torch rotate to horizontal, although that alone for a pantograph torch holder is a major technical challenge.

Processing Beams with Plasma

1. The primary processing function is drilling. However, each hole requires a pierce of the material. So, plasma cutting is required with a pierce time of a second, not oxy-acetylene with a pierce time measured of minutes.

2. While cutting times are comparable, for oxy-acetylene and plasma on heavy plate, the long pierce time of oxy-acetylene overheats the area and heat affected zones are still a problem for oxy-acetylene.

3. Plasma is a very limited distance technology, unlike drilling or oxy-acetylene. The surface position must be known to millimeter precision to calculate the required standoff position. A few mm in error and the plasma will not work or the torch will collide, damaging the torch.

4. Most plasma torches of adequate power are large, 50 mm in diameter and will collide with flanges whether cutting inside or outside the flanges.

5. To get into the corners of beams and around rounded corners, angles other than vertical and horizontal are required.

6. The long product is usually bent 1 mm per meter is nominally straight for a beam but for a 10-meter beams this is 10 mm. At the very least you need height control horizontally as well as vertically and plasma cutters only have vertical height control.

7. As holes must be positioned accurately and the material is often bent, cutting without a workcell and hydraulic clamping will not be accurate enough.

8. Beams are often twisted and flanges bent or not square to the web again an argument for forced clamping in a work cell.

9. Sizes and thicknesses of hot rolled beams can vary significantly even down the length of a beam precluding prepared NC programs.

10. Large, if not obvious bends require computation to adjust hole position as in assembly the bend is removed by force.

11. Prior NC programming is not possible as hole position is shape dependent from the centerline for columns or from one of the flanges for floor or roof designs. NC programs must be generated based on multiple beam surveys.

12. In the art of preparing beams for assembly, the critical dimensions relate to the position of the central web between the two flanges and the width of the web. Depending on whether the beam is used for a floor or a roof or a column, different reference lines must be used. These cannot be programmed as fixed XYZ positions until each beam is measured and at or close to the point where the holes are to be drilled.

13. In traditional beam lines, each beam is measured and the individual NC program prepared internally. In fact, prepared NC programming of coordinates XYZ is impossible as the material is too variable. All that is specified in a prepared program is defined in such a way as to require each beam to be measured before cutting and drilling.

These facts eliminate use of most of the world's NC plasma cutters for beams. Typical 2D profiling NC controls expect preprepared NC coordinate programs generally of nests of parts to be cut from the one plate. That is not possible with the high variability of rolled or extruded beams.

These beams largely are somewhat-unpredictable hot rolled extruded sections with variations in bend, twist, thickness, height, flange width and more.

With the present invention, where beam processing differs greatly from plate processing is that multiple surfaces of each beam are involved and must be measured and hole positions calculated based on actual beam measurements.

Plate Processing

Plate processing is intrinsically a 2D process for a single ideally flat surface. When the plate is not flat an independent vertical control known as Automatic Voltage Height Control (AVC) varies the torch height based on the arc voltage so this axis does not have to be in the NC program. In this way an NC program for a plate can be pre-prepared. AVC is on a separate machine without knowledge of the height profile of each plate. Plate thickness also does not vary.

For weld preparation, changes in height directly impact an angled torch and AVC is not good enough for multi pass cutting. Our U.S. Pat. No. 9,539,664, METHODS AND SYSTEMS FOR PREDICTIVE HEIGHT CONTROL, teaches a laser scanning method to produce a 3D image of the actual plate prior to cutting so that a Z axis can be added to the incoming NC program, increasing critical height accuracy 3D processing of plate. However, U.S. Pat. No. 9,539,664 is about only one surface, an upper surface of a monotonic, nominally flat, and level plate. The present document describes development of mapping of beams which can often have 5 or more surfaces, sharp breaks and discontinuities between horizontal surfaces and vertical surfaces, none of which are covered by U.S. Pat. No. 9,539,664. Special analysis is required to obtain and map these surfaces in conjunction with idealized shapes from an embedded catalog. In total contrast, there is only one cross section for all plate, a rectangle.

The challenge is to take a plate beveling plasma gantry and change its operation completely to be able to accurately measure, sever, drill, cope a whole range of beams. These largely must sit on or above the cutting bed under the gantry without hydraulic clamping in a work cell.

The modified gantry must accurately process the unrestrained bent and twisted beam in situ without forcing the beam to fit by hydraulic clamps and rollers. Also in the development of beamlines, the use of a workcell with large forces was necessary to prevent movement and vibration while drilling. For machines like the Python-X, the same work cell and hydraulic constraints are needed for accuracy but a workcell also is essential because of the limited working distance of a large heavy (often weighing 0.5 ton) floor mounted robot.

So, although in one form Applicant's machine resembles a common 2D and NC programmed plate processor, with many invisible innovations it can accurately drill, sever and cope an unrestrained beam.

The system described herein uses a plasma cutting torch to cut steel. As noted, our machine in FIG. 1 resembles a conventional plate beveling machine and retains that functionality.

With a single adjustment of the torch position (FIG. 3, 310 moved to 325) and a complete revision of how it works internally, the external drive box (compare 5A and 5B), logic internal to the NC control (FIG. 1, 137), and firmware 164 in memory of the control, it will also process beams which sit on or just above the cutting table without clamping. Many individual steps and changes and innovative steps are made to convert the machine to be able to accurately process free standing unrestrained beams. This huge complexity is simply not visible. To someone experienced in processing highly variable long beams, it is revolutionary. The individual changes include the following:

1. The pantograph bevel head must be able to rotate to and beyond the horizontal, something unknown and unnecessary in plate beveling heads. The rotation of plate pantographs are generally restricted mechanically by design, by software, by tables and by limit switches to 45 degrees from vertical. This particular pantograph (U.S. Pat. No. 8,865,056) has no limits in rotation and a 58-degree limit in tilt, far above that of other pantographs but for a plate beveling torch to be able to rotate to horizontal is not known to the inventor.

Figure 4A:
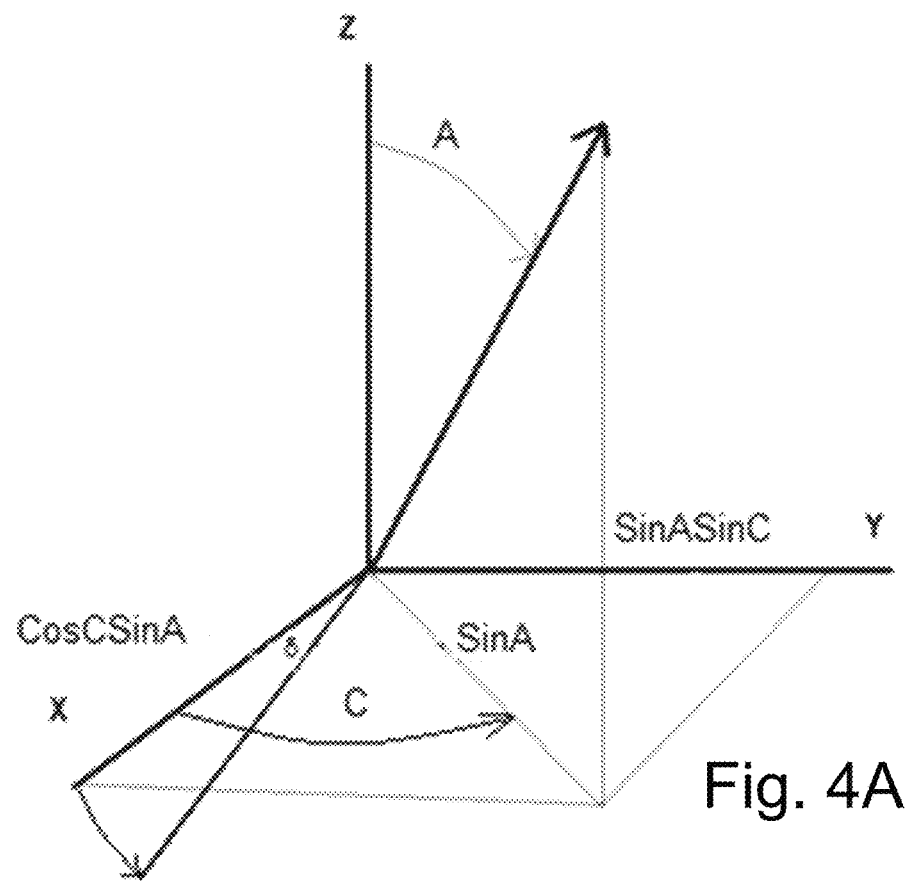
FIG. 4A Shows the programming axes of the cutting machine and torch with the three axes of the gantry machine XYZ and the two-torch tilt and rotation axes of the multibot.

2. The torch must be able to be pushed far past the focal point to get clearance for vertical surfaces (See FIG. 5A for the old drive box clearance (565) even with the extended torch position). This is against every principle which justified the use of a pantograph device in the first place, which was to allow torch tilt independent of XY position. Without this extension, no pantograph held plasma torch can get close to a vertical surface as on the flanges of a H beam. Pantographs are only suitable for flat near horizontal surfaces. In fact, without the tilt downwards of δ as shown in FIG. 4A, they could not approach even a horizontal surface.

Figure 5B:
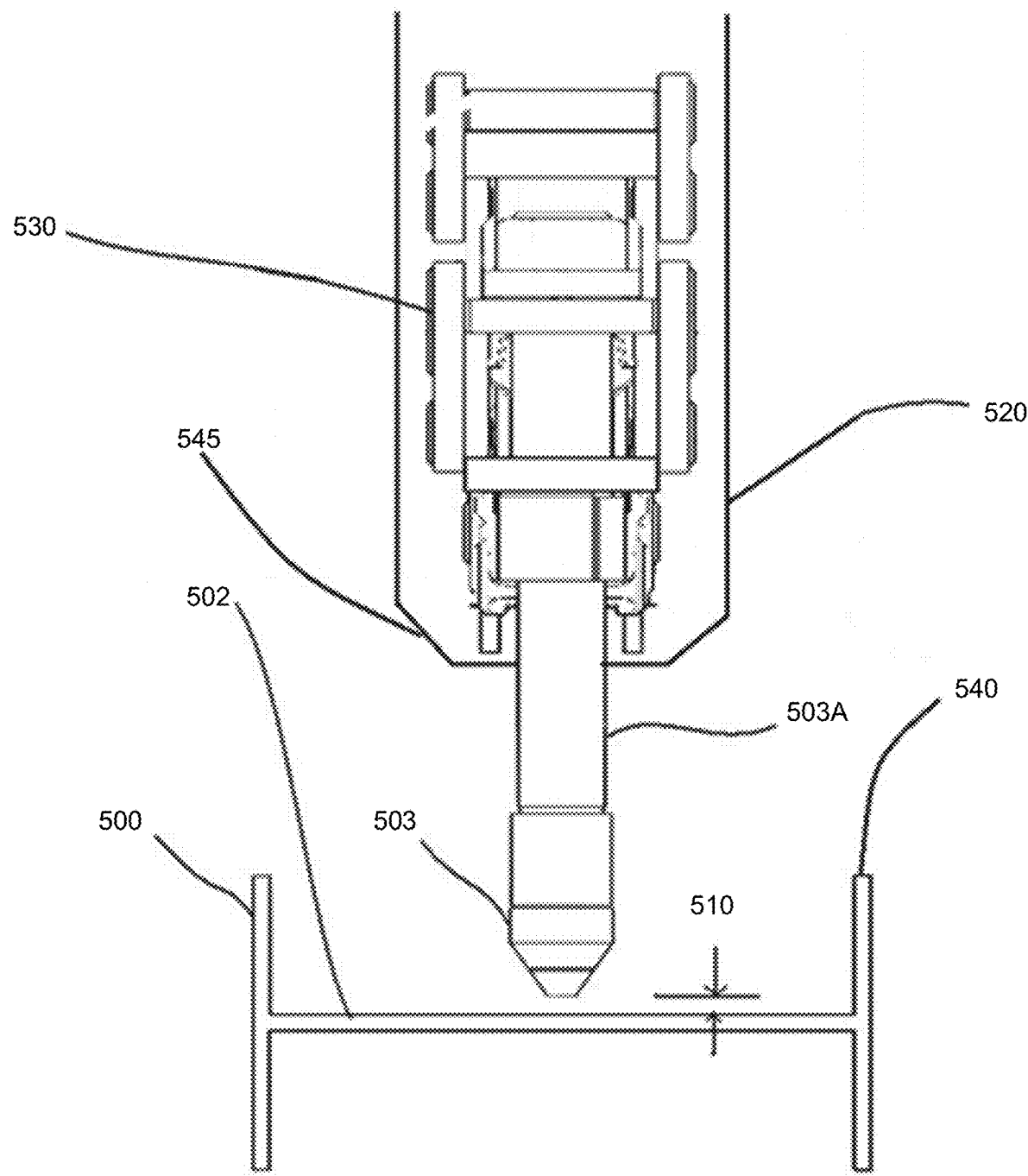
FIG. 5B illustrates a H beam being cut by a vertical plasma torch and the original drive box of Patent Application 2014/0236339 and the limited clearance to vertical surfaces, and further illustrates the need for the torch extension from position B to position A to avoid collisions when cutting long product.

3. Both pantograph and drive box must be as narrow as possible to approach vertical surfaces with a horizontal torch. (See FIG. 5B, 5C, 5D). FIG. 5A shows the limited approach of the original wide box design as presented in parent Patent Application 2014/0236339.

4. The original pantograph drive box must be completely redesigned internally and externally to be nearly as narrow as the pantograph itself and rounded and raked to be able to process around corners and pipe. This can be seen in FIG. 3 and new width 326, rounding 328 and rake 329. Only the pantograph arm (FIG. 1, 127) remains unchanged.

5. Our machine uses a very different approach to handling and manipulation than a beam line or Python-X. In the invention the beam does not move, is not clamped hydraulically, is not forced into a fixed accurate position on the machine and does not necessarily have to be aligned perfectly with the machine axes although that is advisable. Normal bends and twists are measured and such variations compensated mathematically rather than removed through high force hydraulic clamping in a workcell.

Figure 2:
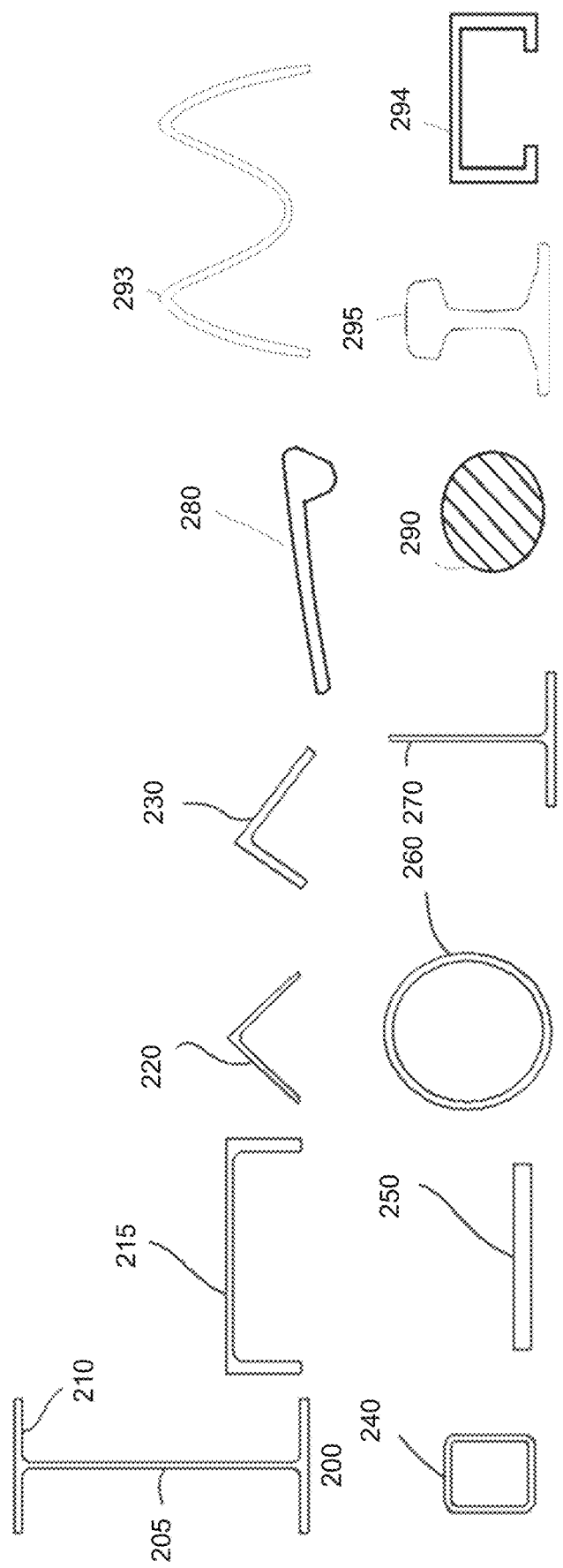
FIG. 2 shows a number of types of 'Long Products'.

6. There is no 'work cell' concept unlike known drilling beamlines and later plasma beamlines, as shown in FIG. 2, where the product is forcefully clamped to align, restrain and so force straightness over a section. In processing beams section by section through a fixed work cell, bending of the beam becomes largely irrelevant while it is a critical issue for an unclamped beam and moving torch. This is also because traditional beamline are effectively blind, unlike our machine, notwithstanding the fact that the way the vision of a distance measuring laser is used fundamentally different to U.S. Pat. No. 9,539,664. and height control over steel plates.

7. Our machine has no rollers in a transport system. (FIG. 2, 177) There are no hydraulic clamps, no hydraulic pushers (powered arm 178) or pullers. No hydraulics at all with all the associated electronics, PLCs, valves, limit switches, wiring and plumbing and logic and cost and maintenance. There is no need for a section of rollers to drop away to provide access to a bottom of beam. As said, there is no obvious difference from a common plate processing machine as all these things are a consequence of the belief that accurate drilling and cutting cannot be done without moving the beam.

8. Our machine can process all areas of a beam in any sequence, not being restricted to the front end, cantilevered into space and the back end, also cantilevered into the workspace.

9. Many sections can be processed from the one beam, even very short sections.

10. Sections are supported at all times, so there is no tipping moment as there is with a short projecting segment.

11. The clamping problems and end of the beam problems of Python-X do not exist in our machine, assuming that the accuracy can be achieved without a hydraulically clamped workcell concept.

12. In using a gantry to move what is essentially a light weight 3 axis robot, the range in XY is far greater than any floor mounted fixed robot. This means many things, like processing of multiple beams on the one pass or multiple parts from one beam.

13. As the beam does not move through a workcell, the machine only must be as long as the beam, not more than twice as long as with a beamline. This is a huge saving in valuable clean, covered factory floor space.

Figure 10A:
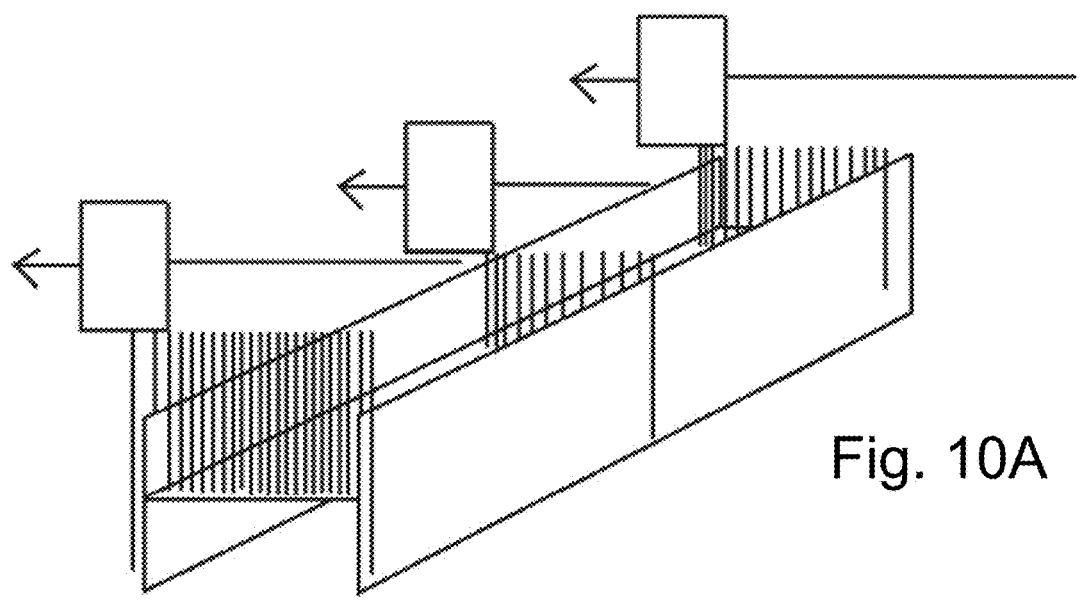
FIG. 10A shows scans across a H beam with many points in each of 11 slices in the Y axis across a beam aligned nominally with the X axis.
Figure 10B:
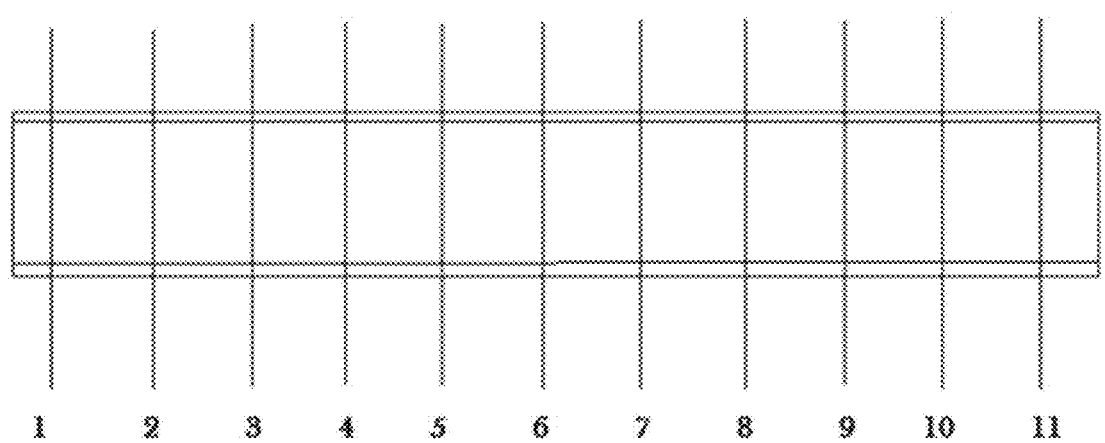
FIG. 10B shows the top view down of the same Y slices across a beam aligned with the X axis. The laser points straight down.

The torch extension described in Patent Application 2014/0236339, but additionally the drive box design was completely changed internally and externally. The additional developments include 1. An ability to build a 3D model in the computer of all the varying surfaces of a beam and the surface intersections, rounded or square. As the beam is unrestrained, bent, twisted and very long, this is a complex task using at least 11 separate scans across the beam down its length, as illustrated in FIGS. 10A, 10B.
   a) This scan has no relation to the mapping of a single near flat, near horizontal, surface as might be useful in plate weld preparation and cutting (U.S. Pat. No. 8,987,636)
   b) The scan has no relation to mapping the edges of a plate to determine the shape of a plate. While the laser could be used for mapping the edges of a plate, this simply sets the limits of plate cutting and is not incorporated in the NC program. However, joins between intersecting surfaces, joins and corners are critical in the accurate sawing of beams and positioning of holes as in beam processing position is always defined by distances to edges. This has to do with how beams are to be used and assembled.

2. Modifications to the plasma bevel head to allow beam processing
   a) Projecting the plasma torch to a second cutting position sufficiently far past the essential focal point that the clearances to adjacent vertical surfaces are adequate. Such a move is impossible with a traditional pantograph and defeats the purpose of the pantograph which is to traditionally to decouple XY from ACZ. The complex implications of this are shown mathematically in equation 2.2.3.1 below.

b) High speed and complex computations are used to offset XYZ with changing AC as the axes are coupled mathematically with the extended torch. Consider that to adjust AC in a pantograph normally requires no change XY or Z. Now all five axes are mathematically coupled and must move synchronously in real time, something impossible without high speed computation and mathematics within the real-time system.

Such complexity is only on two commercial NC controls known, Power Automation and Beckhoff. Both controls are designed for the multi surface multi axis machining market, not the simple 2D plate cutting market. The ability to embed complex computations at high speed is a major development, but invisible to the naked eye where everything just works smoothly. This makes the torch extension possible. Existing plate beveling NC controls lack this functionality. They are universally simple 2D XY controls with an independently controlled third Z axis, often an entirely separate Z-axis control system.

c) Development of the mathematics to allow completely formulaic control of the bevel head, including the offset. Table driven systems as in Buccella (U.S. Pat. No. 9,687,933) are inadequate for the five simultaneous movements required. The Buccella system relies totally on the independence of XY from AC and from Z provided by having the torch tip at the focal point. Using a fine thread push pull mechanism in the Buccella head, even A is disconnected from C meaning a simple table lookup is possible and real-time mathematics is not used.

3. Complete redesign of the bevel drive box (FIG. 1A, 130). After filing of Patent Application 2014/0236339 it was realized that this was necessary. This box holds the rotating and tilting pantograph arm on the gantry. While retaining the essential features, the light-weight aluminum Faraday cage electrically, the single cable electronics input with all internal amplifiers, motors and gearboxes, the whole design was changed to eliminate the belt drives, use metal gears and mount the motors one behind the other. The drive box then becomes multi-purpose, as it is useful for both plate cutting with weld preparation and for beam processing.

Figure 16:
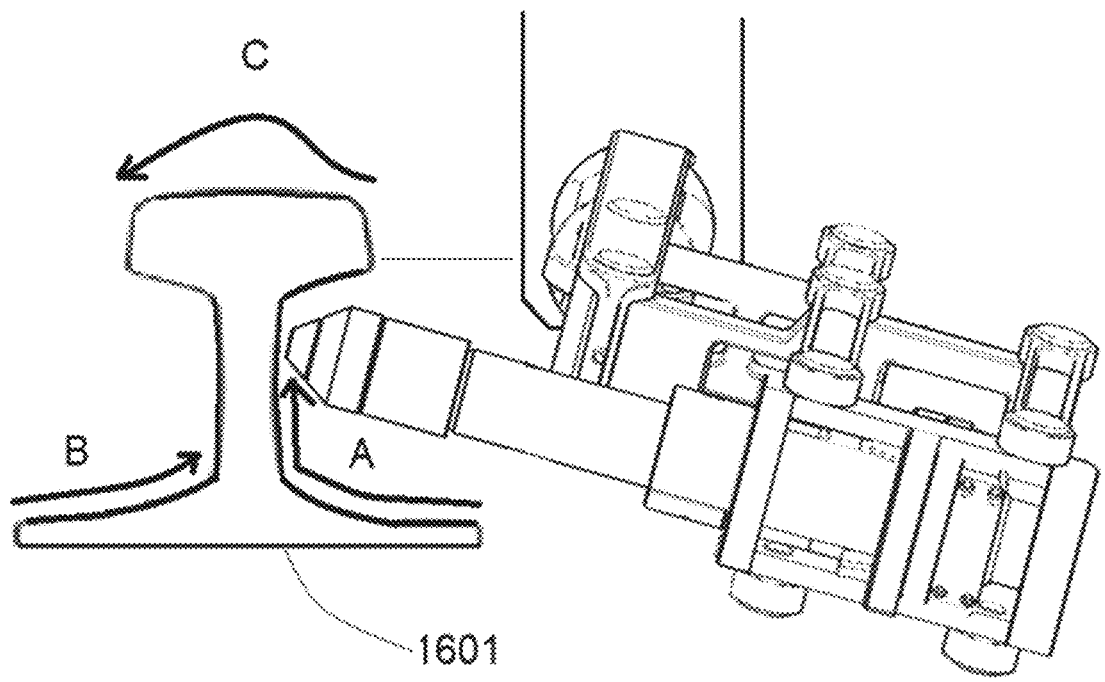
FIG. 16 illustrates a method for cutting railway track using three individual passes and severing the rail completely.

FIG. 5A illustrates the vastly improved ability to approach vertical surfaces. FIG. 16 shows one of the new possibilities created in cutting rail line.

4. The backplate or fixed mounting plate attached to the gantry (FIG. 3, 333) for the up/down Z axis also must be much narrower to minimize collisions.

5. The depth the bevel head drops below the back plate (FIG. 3, 325) is greatly increased as the backplate (FIG. 3, 333) is fixed on the gantry and can itself collide with flanges even if the drive box does not. In other words, the plasma torch must be lowered far below the bottom of the mounting backplate, a requirement which does not exist in processing almost flat plate.

6. The cone shaped tip of the plasma torch must be less than or equal to 90 degrees to get into corners between web and flange (580, FIG. 5D). Only two existing plasma torches qualify, ESAB M3Plasma and Kjellberg. Where more blunt torches have been used, notably by Python-X, it severely restricts the torch's access into even normal square corners.

7. The narrow drive box must now be supported on light weight outriggers (FIG. 3, 332) to maximize sideways stability of what is a very long device cantilevered from the gantry.

Figure 3:
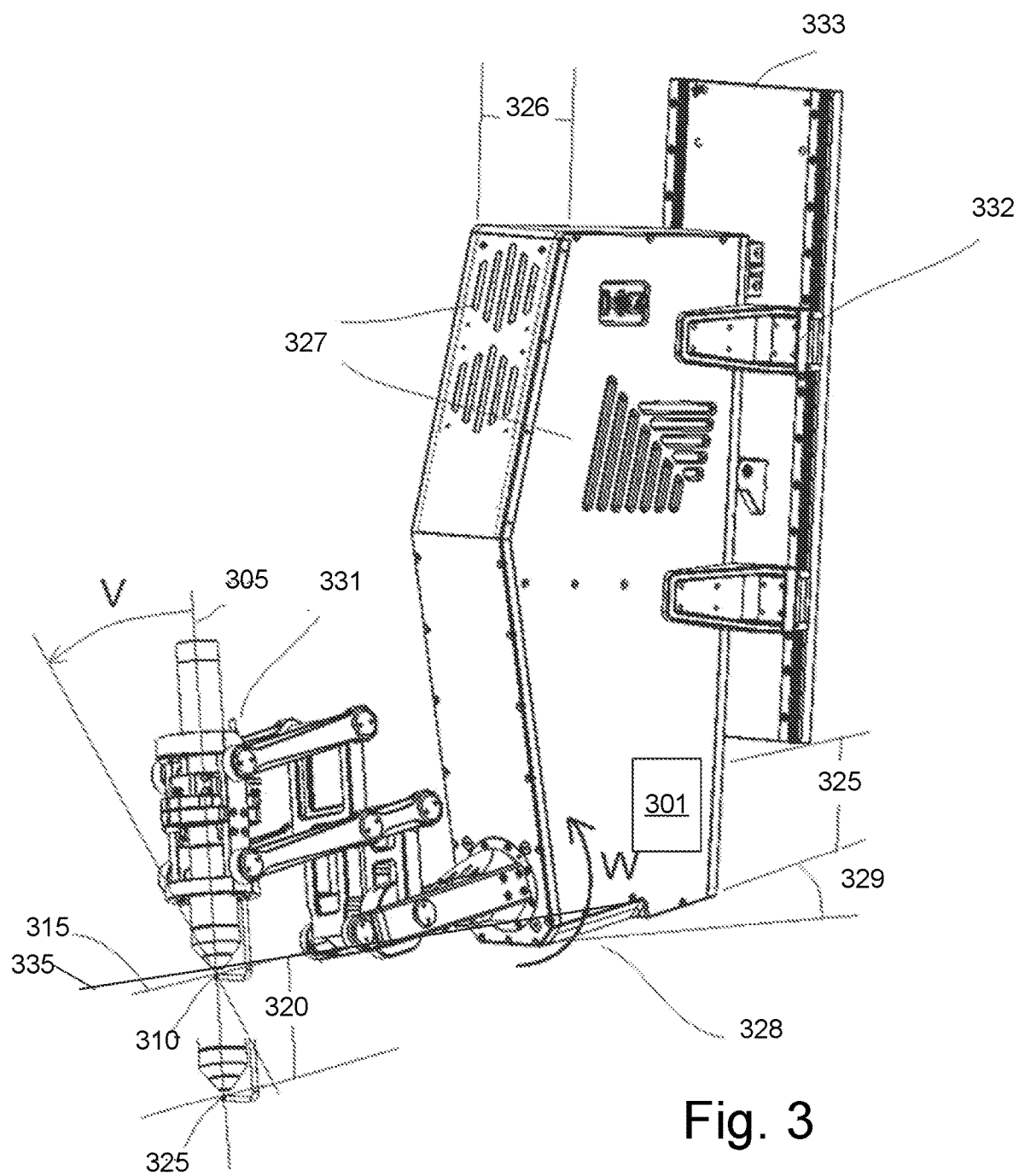
FIG. 3 shows an improved multibot plasma plate beveling head (U.S. Pat. No. 8,865,056) as modified for beam processing while retaining plate beveling capacity.

8. Substantial milling of surfaces to reduce the weight of the drive box closer to and under 50 kg, sufficiently light to be added to a common gantry machine with redesign of the machine. (FIG. 3, 327).

9. In all this the rigidity must remain as any vibration from motion and harmonics will destroy accuracy and the accuracy required at all times is around 1 millimeter.

In general, use of a mobile lightweight robot-like device eliminates both problem of the limited reach of a fixed location robot arm, while also eliminating the vast amount of investment required to move the beam smoothly and accurately through a work center. However accurate positioning of holes relative to edges requires innovation in how a beam is measured and how those measurements are used to create the NC program inside the machine.

To get access to the bottom of a beam (FIG. 1, 160), the beam must be raised off the normal cutting bed by a platform placed on the cutting bed or simply at fixed points (FIG. 1, 162). This can be a simple as pieces of angle iron.

To avoid collision with such supports the NC control can indicate to the operator the places in which supports are to be placed or alternatively support locations are established by laser scanning and potential collisions calculated and avoided. Specialist supporting frames could also be manufactured cheaply and they could contain the ability to flip or accurately roll closed or near closed beams or pipe where needed. It is advisable to include a way to align the frame with the X axis to minimize corrections and to lightly restrain and align the cut material to minimize thermal movement or unintended rolling.

A large plate plasma cutting and weld preparation 2D machine is generally required in a metals service center even if the service center a beam machine like the Python-X, but the present embodiments allow for elimination of specialty beam processing machines. One gantry machine can process all long steel products, from flat plate to pipe, as well as sections like I-beams. It can also cut metal fabrics (U.S. Pat. No. 9,952,581) and cambered beams and other non-structural long product like ARMCO, rail and bulb flat (FIG. 2, 293, 295, 280)

Essential Innovations in Detail

Apart from the complete redesign of the bevel drive system to make it taller, narrower, rounded, lighter, more stable and with greater depth for cutting between flanges, it is the individual critical developments inside the computer control which make the processing of unclamped beams possible.

Real Time Transformation for Four or More Synchronous Machine Axes

In plate cutting machines, only a 2-axis simultaneous control is required, smoothing moving in X and Y simultaneously. For plasma cutting with a pantograph, the tilt and swivel of the torch generally works independently mechanically of X and Y. This means tilting in A and/or C poses no requirement to move the machine in X or Y to keep the torch tip stationary. So, a machine smooth in X and Y can smoothly change A and C at any time. For general plate cutting applications there is very little Z movement—just enough to compensate for surface irregularities of plate—and it is essentially a two axis X and an independent two axis torch application.

A pantograph produces much higher quality of cut in plasma applications as coupled axes mean moving a 1-ton machine smoothly and quickly over very short distances take time and delays will create unacceptable marks on the plasma cut surface, especially when cutting smooth curves. So, the independent pantograph produces smooth cutting on sloped surfaces, especially curved surfaces and in corners. The pantograph also does not rotate the torch very much, where others such as the Messer Greisham Planetary motion creates a substantial rotation, making centering of the torch critical.

In cutting long product, major surfaces are also vertical and sloped as with Angle (FIG. 2, 230). For sloped surfaces, you need simultaneous movement in XYZ, three axes simultaneous. This is not possible on most controls from the 1980s and 1990s or on most current NC controls. Z axis control for plate cutting is generally independent and connected to a feedback loop with a separate voltage height control system, amplifier, motor and drive gear. This is the case with Buccella (U.S. Pat. No. 9,687,933), which remains a traditional 2 axis beveling plate processor possibly incapable of simultaneous high speed multi axis synchronous movement in XY and Z. Such plate beveling devices rely explicitly on the mechanical independence of all the axes.

Also, while it might be presumed by casual readers that the Buccella bevel head (U.S. Pat. No. 9,687,933) and many similar systems can move synchronously in XYZAC, that is unlikely and perhaps impossible given the Burny brand Z-axis control used. Certainly, Buccella teaches nothing about synchronous movement in Z and height control is still independent from the NC control and Z-axis information is not part of the NC program.

While our machine superficially resembles existing flat-bed plate cutters, it is capable of complex movements not considered by existing flatbed plate cutters. This permits the required torch extension which allows processing of beams.

For cutting pipe and to keep the torch square to the curved surface at all times you need five synchronous axes, XYZAC. Note that when sawing in a fixed YZ plane across a pipe, you only need four axes. For angled cuts, you need the entire five axes synchronous which is not a limitation for the invention. In some countries the sale of synchronous five axis cutting technology is restricted by law. This means pipe cutting is restricted legally in some countries to square cutting and not mitered cuts or simultaneous weld preparation of pipe.

The great impact of using 4-5 axes and mathematical transformations in real time, setting our machine apart from simple 2D plate processors such as Buccella (U.S. Pat. No. 9,687,933), is that extending the torch past the focal point was simple. While this created complexity in the coupling of all axes the solution was mathematically straight forward. While this was not previously elaborated, compensation required only the extension of the previous transformation formula 2.2.2.1 with the torch extension vector in 2.2.2.2.

It is important to note that Kerf compensation or cut width compensation and circular interpolation is also included in the calculations so that separate NC kerf compensation is not needed.

The mathematics of the transformation are detailed in the next section.

Real Time Conversion of the Axis Position XYZAC (FIG. 4A) into the Mechanical Axes XYZUV In addition to rotation around the rotation axis 315, the pantograph permits rotation of the torch tip around a tilt axis 335 perpendicular to the rotation axis 315. V and W are internal mechanical pantograph axes and affect movements shown as V and W in FIG. 3. These are related to the notional pantograph axes $\alpha\beta$ (FIG. 4B) by 2.2.2.1 Conversion of pantograph axes to mechanical axes
Twist drive $W=\alpha$
Tilt drive $V=\beta-\alpha/3$ The coupling between is due to the circular drive for the tilt axis in that rotating the twist axis also implies a large change in the tilt axis with a 3:1 gearbox ratio. The tilt axis is perpendicular to the twist or rotation axis.

To derive the pantograph axes from the programming axes AC you require 2.2.2.2 Transformation formulae from programming axes AC to pantograph axes $\alpha\beta$
$\alpha=\text{atan}((\cos\delta\sin A\sin C+\sin\delta\cos A)/(-\sin\delta\sin A\sin C+\cos\delta\cos A))$
$\beta=\text{acos}(\sqrt{(-\sin\delta\sin A\sin C+\cos\delta\cos A)^2+(\cos\delta\sin A\sin C+\sin\delta\cos A)^2})$ All this is computed in real time while the cutting head is moving. This is done through a direct module connected to the real-time system so that the VW movements are synchronous with the XYZ movements. Only a high-speed CPU with a floating-point processor is capable of this performance.

The Mathematics of Extending the Torch Past the Focal Point.

As in shown below, a pantograph is only one of many ways in which a plasma cutting torch can be held but it has the distinct advantage of allowing tilt in any direction without movement in XYZ and without requiring the machine to be moved simultaneously.

Kinematically decoupling XYZ movement from AC movement is preferred for quality of weld prepared cutting on near flat horizontal plate. However, manufacturers who use a pantograph typically require the cutting point of the plasma head (FIG. 3, 310) to be at the exact focal point of the pantograph to decouple XYZ movement from AC movement for the machine to function correctly. (the focal point is at the intersection of the armature 315 and the Z axis 305).

Such manufacturers can convert programming axes A (Tilt or Azimuth) and C (Rotation) into the internal pantograph angles $\alpha$ and $\beta$ by a simple lookup table. This table is created just once by measurement or modelling, usually with a tilt limit of 45 degrees. This is the technique used by Buccella. This table approach avoids completely the need for high speed real time computation but also totally prevents the use of torch past the focal point. For Buccella the table incidentally prevents the rotation past 45 degrees as the table is limited to 45 degrees. The Buccella head is also limited by software and mechanical stops to 45 degrees. This is reasonable for plate processing but any of these restrictions make the invention unusable for beam processing, despite superficial similarities in appearance.

As can be seen in FIG. 5A, the nature of a pantograph with the torch tip in line with the arm the torch focal point is only slightly below the boundary of the box means it cannot cut adjacent surfaces or enter between the flanges (FIG. 5B) without the box hitting the flanges.

The other aspect which prevents normal pantographs from extending the torch is the degree of high speed computation required. Consider FIG. 4B. The torch is still at angle AC but not at the focal point. So, the new cutting point is a distance from the focal point is calculated by the unit vector given in equation 2.2.3.1.

2.2.3.1 Torch extension unit vectors for projection length T components Tx, Ty, Tz
$Tx=\cos\delta\sin A\cos C-\sin\delta\cos A$
$Ty=\sin A\sin C$
$Tz=\sin\delta\sin A\cos C+\cos\delta\cos A$
Where $\delta$ is the tilt of the pantograph from the X axis.

Extending the torch beyond the focal point means that any change in A or C produces a large and immediate change in XYZ required to maintain the torch at a same location over a workpiece. All the five axes are coupled requiring synchronous movement in all five axes because of a torch tilt. In most cases on a single plane, only four axes are required. Such computation requires high speed computation with only the few millisecond time slices of a high speed real time system; in our system the computations of X, Y, and Z offsets required to maintain the extended torch at desired locations over the workpiece are performed by firmware 164 on controller 135 in real time as the torch is rotated in the rotation axis or tilted in the tilt axis, using floating point arithmetic in a high speed processor of controller 135; these offsets are applied immediately to keep the tip of the torch at desired X, Y, and Z locations as determined for desired cuts as determined from a laser map of the beam, the ideal shape of the beam, and desired locations of cuts relative to actual ends of the beam. The pseudo real time slice systems of the major control manufacturers such as Microsoft Window Embedded are not only too slow but offer no facilities to include such mathematics in the computation of axis positions in real time.

Creating many surfaces in 3D from individual laser derived cross sections.

When processing beams we must know in each case what is on the bed, knowing all points on all surfaces to millimeter precision. Consider in plate cutting we only had one large flat near horizontal surface, now there are many surfaces. The NC program was only in X and Y as Z was largely irrelevant for general cutting. Consider also in the invention that we cannot imply position from work cell. The beam to be processed is sitting untouched at a position on the bed.

Figure 9A:
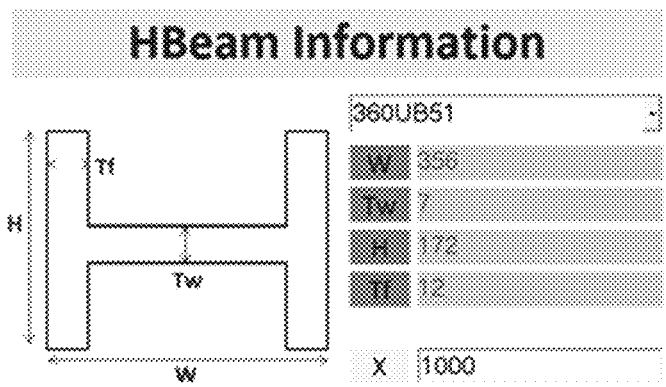
FIG. 9A shows ideal dimensions for a "H beam" or "Universal Beam" with a catalog name of "360UB51". Such names vary from vendor to vendor, even for identical beams.
Figure 9B:
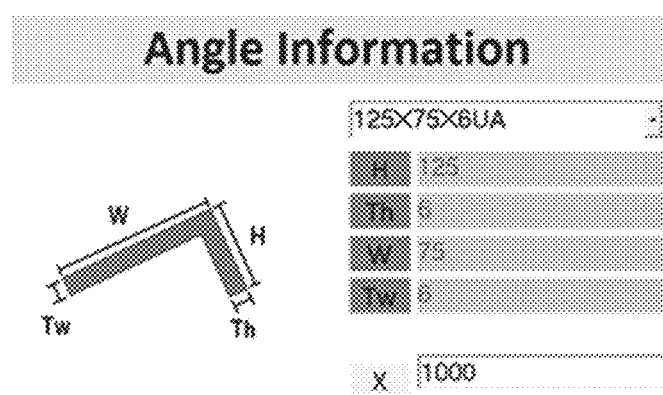
FIG. 9B shows ideal dimensions for a specific "Unequal Angle" with a catalog name of "125X7X6UA".
Figure 9C:
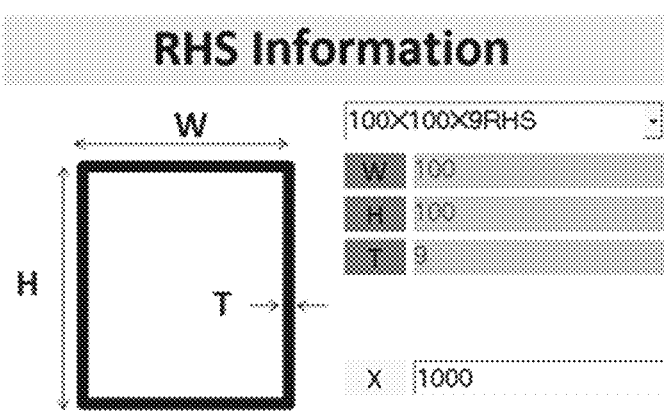
FIG. 9C shows ideal dimensions for "Rolled Hollow Section" with a catalog name of "100X100X9RHS"

Firstly, we must know what the beam is from the long products shown in FIG. 2. Then we need to know the nominal dimensions of the long product, such as by looking up the product type in a table to give the notional dimensions of this named product (FIGS. 9A, 9B, 9C). However, this gives us no idea where the beam is or its exact shape. Consider also that the positions of drilled holes on a beam is not absolute but determined by the distances to edges and corners as laid out in the parametric program. Drilled holes in beams are measured typically from a flange or from a centre line as is necessary for erection.

Figure 11A:
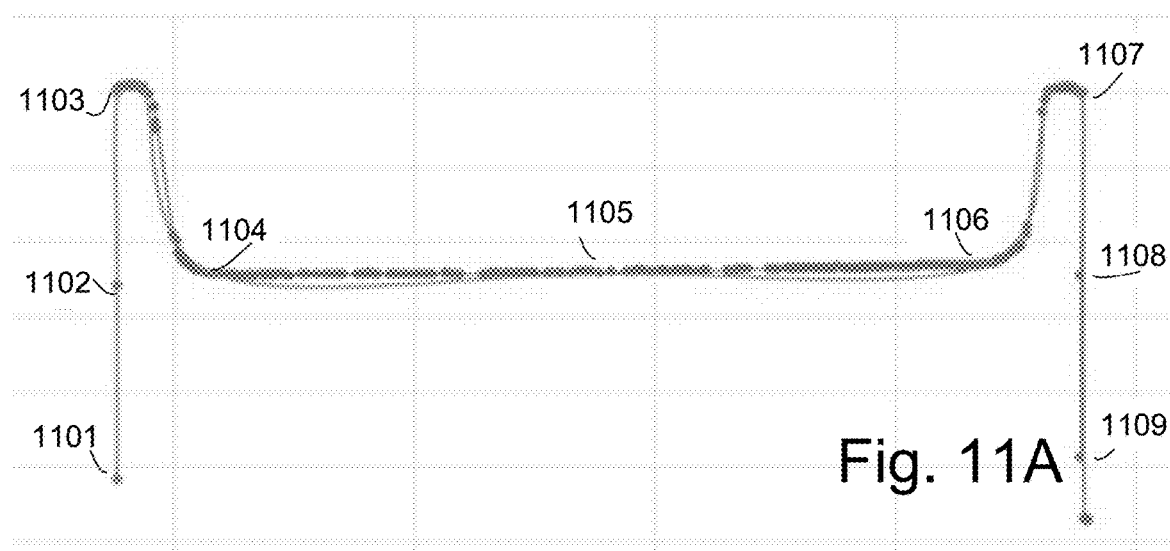
FIG. 11A shows a single scan of a H beam and smoothing and fitting required to obtain the critical control points 1101-1109 as measured by the laser mapping device during a scan of the H beam. These points are needed to both confirm and define the actual shape of a beam as it sits on the bed. Ultimately the position of all holes is determined relative to these points and an end of the beam.
Figure 11B:
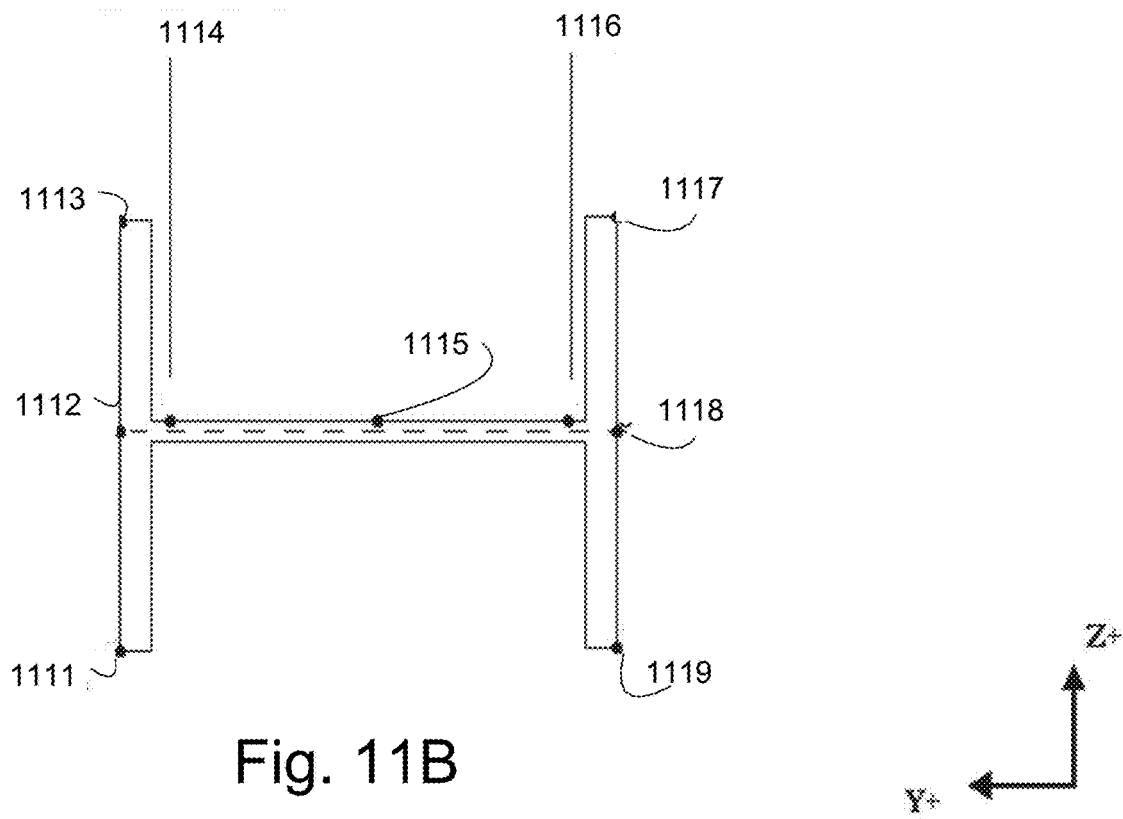
FIG. 11B Shows the nominal points required to be defined to confirm and define the precise shape of a beam relative to a beam.

Eleven laser scans across the beam allow us firstly to locate this beam on the bed and determine points by measuring them as illustrated in FIG. 11B for a single scan. By collecting those points inside the control computer, it is then possible to define each of the five surfaces of say a H beam and to map those surfaces, inside and outside, down the 11 scans across the beam. This process is detailed in FIG. 12. Of course, it would be good at this point to flag if the scanned shape does not match shape of a desired long product.

Figure 13:
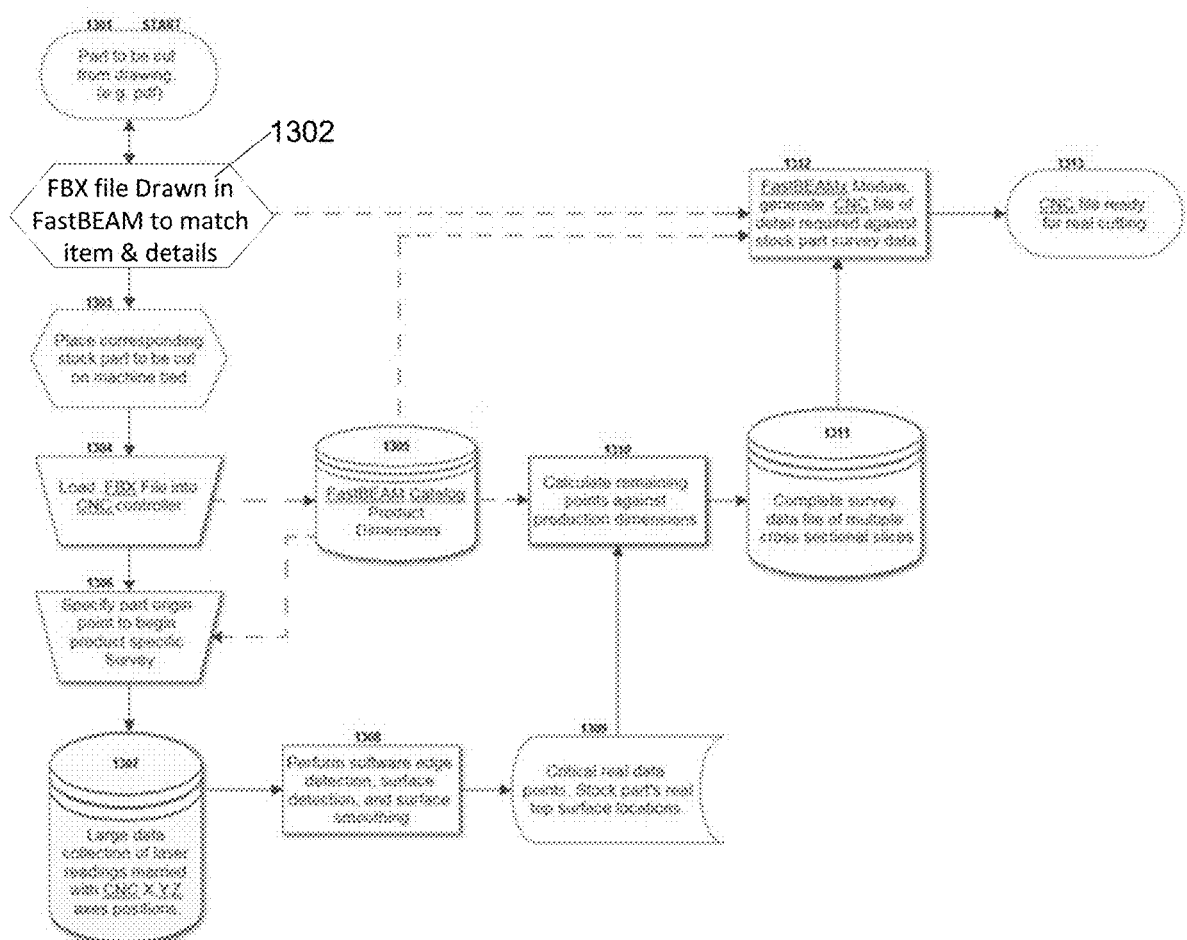
FIG. 13 is a flow diagram illustrating combining the canonical definition of length, copes and holes and penetrations with the results of the scans for each of the 11 cross sections from "data.init" to allow FastBEAM-X to create the required final NC program.

Any of the points on a surface can be mapped relative to the desired XYZ position on the ideal beam and from the reference datum used for the program, say distance from the top flange, the bottom flange or the centerline. Then, as shown in FIG. 13, all this information is collated and the final NC program can be generated based on what is observed. This process is repeated for every beam.

Figure 17:
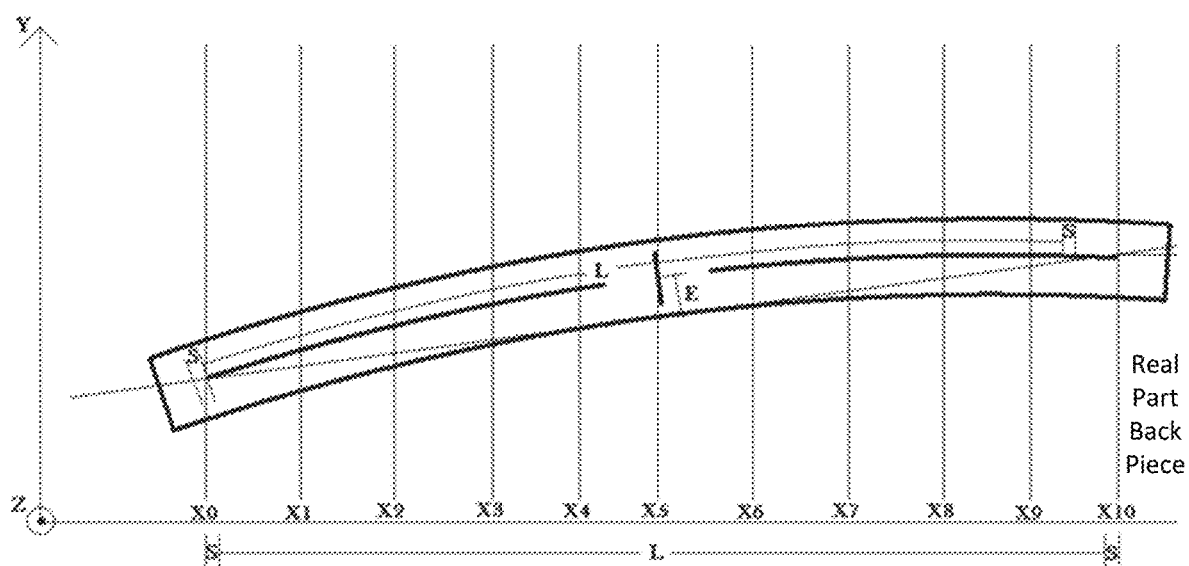
FIG. 17 illustrates allowance for both non-alignment of a beam and the camber or bending of an unclamped beam showing the 11 cross sectional laser scans used to identify and map the beam surfaces.

As shown in FIG. 17 in piecewise fashion, any desired point on any surface between the 11 scan slices can be determined by interpolation. There is a limit in this calculation of a notional 0.015 radians of bend or about 0.8 degrees beyond which a notionally straight beam is considered unusable as the errors are too high in straightening. This may not seem a lot but on a 7-meter beam this is 0.015*7000 or 105 mm.

2.3 Closed Sections Including Pipe

Closed hollow sections, such as pipe, presents a different problem as, unlike the Python-X, we cannot get under the beam. The low-cost solution is to flip 180-degrees and rescan; for product like purlins (FIG. 2, 294) and RHS (FIG. 2, 240) this is simple, accurate, and fast. For pipe it is more problematic but a simple device with stops to roll n*D costs little. You can also use an electronic tilometer attached to the pipe by the operator and the control could measure the degree of roll.

Most pipe cutters use 2D controls and rotate the pipe, using the Y axis as a rotary axis. This means real problems though because pipes are long and invariably not straight and heavy and have to be supported. The whole setup gets very expensive and complex again. In the invention pipe processing is easy and cut to length very fast. A series of cuts on the top, a 180-degree roll and the severing cuts on the bottom. No additional cost.

2.4 Extension to Non-Straight Product

There is the interesting possibility of drilling and sawing precambered beams not covered by DSTV. It can however be done by our system and that opens a new class of cutting where long products can be formed as needed before processing.

One big application is in preparing truck chassis rails which could be processed after forming, or even after assembly, by driving the chassis under the gantry of the machine. This would save a great deal of time and prevent the current process of cutting the web to order for the many penetrations required by each customer and then welding on the flanges. Preformed extruded beams could be processed in minutes.

Minimizing Movement from Heat Expansion

The actual sequence of cutting without restraints raises questions about heat induced movement in cutting. This can sometimes be solved by changing cutting paths, as in sequences illustrated in FIGS. 14 and 15. We have found by experiment that the sequence of FIG. 15 produces no movement as the heat is applied equally to both sides.

There is always the possibility of using light restraint or mechanical clamping in these cases, at no great expense. While there is currently no provision in the scanning for movement after scanning including the movement from heat expansion. There is always the possibility of additional scans and checks.

Described herein are methods and systems for processing long products (cross-sections of which can in FIG. 2, for example) on a gantry plate cutting machine, as best seen in FIG. 1

FIG. 1A Illustrates a 3 axis bevel head on a 2-axis gantry style plasma cutter processing an I beam (160), for example, on a machine bed 140, 142. In this example, the machine bed 140 and plate supports 142 are collectively termed a bed. The cross beam 150 which rides on two rails and spans the bed is referred to herein as a gantry.

Gantry 150 supports a plasma bevel head 127, which in turn holds a plasma cutting torch 125. In this illustrative example, angle iron pieces 162 are used to support the beam 160 so that the torch 125 can to cut the bottom of beam flanges (not numbered) FIG. 1 further illustrates an NC controller 135 having an amplifier 137 that may provide power for control of the XY axes, which may be included with the system shown in this example. The power for the torch tilt axes I included in the drive box (130) as is the power and control for the vertical torch Z axis. Unlike almost all gantry plasma machines, there is no separate Z axis control for torch height, and the drive box provides 3 axes of movement, not two.

Operation of the system of FIG. 1A is controlled by the NC controller 135, which in this example may be a standard PC having at least one driving amplifier 137 for the X-axis 120 and the Y-axis 122. NC controller 135 controls operation of the bevel head 127 for the internal Z-axis as well as the AC axes (not numbered, best seen in FIG. 4). In this example that utilizes the 3-axis bevel head 127, the Z-axis is integrated with the drive box 130 that allows vertical (up and down) movements on a back plate 124 in the Z-axis direction. (also see FIG. 3, 333). The drive box 130 includes an internal triple amplifier (not numbered) that can convert signals from the NC controller into precise positions along the Z-, A-, and C-axes. The programming axes XY are separate while the ACZ axes are all controlled inside the drive box 130 which contains all amplifiers, motors, gearboxes as required.

In an embodiment, the plasma torch 125 may cut at its tip (e.g., cone 503, FIG. 5A) with a plasma arc of between 30 and 600 amps, depending on material thickness. In an embodiment, primary movement of the torch is along the X- and Y-axes rails 120, 122, that is, along the horizontal plane of the bed 140. In this example, the X-axis is represented by a long axis rail (unnumbered) of the machine on which the gantry 150 sits, and the bevel head holding the torch can be seen to also move along the Y-axis rail 122, represented by a short axis rail in this example (unnumbered) As described above, a typical positional accuracy is better than +/−1 millimeter for plasma cutting.

As also described above, conventional XY plate processing machines control Z-axis movement, if any, by an independent Torch Height Control (THC) In such conventional systems, a controller (e.g., NC controller 135) serves only to turn on and off the THC system. Such conventional systems, unlike the present embodiment, are strictly 2-axis XY machines although an additional 2 axes may be added for beveling. According to the present example, however, additional Z-axis movement along back plate 124 is directly controlled by the same computer (i.e., NC controller 135) as the X- and Y-axes 120, 122. According to the present embodiments, therefore, synchronous control is achieved along all three X-, Y-, and Z-axes and with tilt axes A, C. Older controls have two synchronous axes XY and the additional bevel axes when available are likely to be simultaneous rather than synchronous. The difference is what happens on a scale of a few milliseconds or synchronous rather than hundreds of milliseconds of simultaneous. To the human eye these are synonymous but to high speed plasma cutting the difference can be dramatic and unacceptable.

Our machine provides 4 or more axes synchronous movement of axes XYZAC as shown in FIG. 4A.

Collectively, these axes are positioned to control the cutting tip (i.e., cone 503) of the plasma torch 125, and cutting point can then be approximately 8-12 mm from the point of the brass cone 503

FIG. 2 illustrates cross-sectional views of several exemplary long products. I beam 200, having web 205 and flange 210, is described most extensively herein, and is featured in several embodiments for purposes of illustration of all 'Long Products'. The examples shown in FIG. 2 are thus provided as an illustrative list, but are not meant to be exhaustive of all shapes of long product material that may be addressed by the present embodiments With reference to both FIGS. 1 and 2, I beam 200 can be a 360UB45 beam, in this example, for illustrative purposes A 360UB45 beam is a Universal Beam which is 360 mm high and weighs 45 kg/meter Specific descriptions of this type of beam though, may vary from country to country and from mill to mill. For example, consider that the beam is more accurately in one case 352 mm×171 mm and 44.7 kg/meter and is known as a 360UB44.7.

In practice any given shape can have different names locally, and the I beam 200 may itself be described by its center piece, or web 205, and its flanges 210

For even such defined shapes, the web height and flange width, as well as the overall material thickness, can vary, as can also the weight per meter. Thus, for a given physical space, the strength and weight of the beam can vary in practice, and/or according to the requirements of the designer. For purposes of the present embodiments though, the discussion presumes that the shape of the beam is nearly constant over its length but the present embodiments can operate successfully even where the shape is not constant over the length of the beam. The present embodiments may also be utilized in cases where beams are fabricated from cut and welded flat plate and not hot rolled, in addition to product where the cross section can vary down the product's length.

Referring to FIG. 1, the beam 160 may be placed on the machine bed 142 with the web horizontal (e.g., element 205, FIG. 2) and the flanges (e.g., element 210, FIG. 2) vertical to the bed 142. In this example, cutting and drilling of the beam 160 may be performed on at least three faces of the beam. Consider though that there are 8 faces for marking of which only three are accessible. For closed shapes like 240, 250 and semi closed shape like 294 not all faces can be cut in the one pass. Then you have material without flat faces like pipe (260) and rail (295) where the torch is rarely either horizontal or vertical and the torch can be below horizontal as in FIG. 16. All can be processed fully with the invention, but a few like pipe require a second position to access all faces. Beams, though, can be processed in one pass.

The beam 160 should be supported above the slats (i.e., angle iron pieces 162) on the plate cutting bed 142. In this example, the angle iron pieces 162 allow the beam 160 to be raised above the bed 142 by a distance (e.g., element 560, FIGS. 5A, 5C) to enable cutting to the bottom of the flange 210 without collision with the bed (e.g., element 550, FIG. 5A) of the bed 142 by parts of the bevel head 127. Other processes of lifting the beam 160, and/or maintaining a distance of the beam 160 above the bed 142, are contemplated by the present inventor without departing from the scope of the present application.

In an embodiment, the NC control 135 can examine the processing NC program for each beam that may require patterns of drilled holes, and/or other operations at specific points along the length of the beam 160. In this case the NC controller 135 is further able to calculate precisely where support is both needed and/or best utilized, and optimally where the support will avoid collisions with the torch holder operating on the flanges.

In an embodiment, support placement information can be manually entered into the NC program or automatically calculated by the NC controller 135.

The NC controller 135 may also read programming requirements in a beam specific language for beam processing, such as DSTV, discussed above, and convert the requirements into a sequence of XYZAC movements. This elaborate and mathematical process integrates laser scans giving surface and edges of an actual beam with the formal shape of the beam and its expected nominal parameters, and ultimately creates a beam specific NC program for each beam and dependent on exactly how it is presented on the machine and where it is located and all faults, twists, bends and other variations from ideal.

According to this example, the controller 135 converts a requirement to cutoff at a specific distance into a series of head movements, which achieves the same effect as an operation using a saw.

In addition to DSTV, the present inventor contemplates that the present embodiments may be utilized using other developed file formats which provide portability from machine to machine, including the inventor's proprietary FPV file output format of the FastPIPE™ program and the FBV file output of the FastBEAM™ program. Such additional programming file formats convey the results to be achieved by the controller regardless of bends and other variations. As cutting beams involves so many surfaces and the shape is so highly variable at a millimeter level, the final coordinate NC program cannot be prepared beforehand as is traditional in NC programming. An individual program must be written in situ for each beam as it is presented. The ability to read and interpret files including FBV, FPV, DSTV and create a piece specific NC program eliminates all commercially known controls in the general gantry NC control business.

Whether provided to the NC controller 135 externally or calculated by the NC controller itself, the NC program that guides the torch 125 may include XYZAC positions that guide the torch cutting point (i.e., element 315 or 325 of FIG. 3) along the X-, Y-, and Z-directions on the surface of a product while controlling the torch orientation (AC) about a particular cutting point. In an embodiment, the final NC program will include a coordinate value to each address XYZAC. However, this NC program is unique and only useable for this particular beam and set of requirements and physical position on the machine at the time of the scan. It does not and cannot correct for movement of the material after scanning, say during cutting.

FIG. 3.3 illustrates an example of a 3-axis pantograph bevel head machine that may be used for plate weld preparation. In this example, the torch (i.e., element 125, FIG. 1) is shown as extended from a focal point 310 to a new point 315 for the torch to be able to cut beam flanges (FIG. 5A) from both left (FIG. 5C) and right sides (FIG. 5B) with clearance (565 in both FIG. 5B and Fig. c).

In this example, the 3 axis pantograph bevel head (e.g., bevel head 127, FIG. 1) described above is illustrated as shown in FIG. 3, the tilt value V is shown from a torch center about the focal point 310. The focal point of the mechanism is defined as the intersection of the line 305 to 310 through the center of the plasma torch body and the rotation axis of the pantograph axis 315. The pantograph mechanical axes are V and W. In fact, the V machine axis is an internal rotary drive axis inside the bevel head and connected to the torch tilt β relative to the axis of the pantograph, 315. So, V and β are connected by the relationship in equation 2.2.2.1. but both relate to the tilt of the pantograph so it is simpler to visualize them in this way.

FIG. 3 also shows a new sliding rod 331 which has two fixed positions for the two working positions of the plasma torch.

For the bevel head 127 to achieve maximum accuracy in plate beveling, the torch tip is positioned at the focal point 310. In this position #1, both C and A can be varied while the machine is stationary, i.e. without changes in X, Y or Z.

New position #2 is at 315 and allows much more clearance from flanges and to prevent collisions as can be seen in FIG. 5A. which also illustrates the new narrow and much taller drive box 130 (FIG. 1). As explained extension of the plasma torch past the focal point defeats the logic for having using pantograph mechanism in the first place as all the axes are now involved in tilting the torch. On the other hand, we now have a complex plasma robot at no additional cost and competent in processing of full size plates and weld preparation of cut parts from plate.

FIG. 4A illustrates the traditional programming axes XY of a plasma plate cutting machine plus the axes specific to the three axis pantograph head AC and Z. XYZ are physical axes. A & C are notional axes using polar coordinates and do not directly correspond to individual physical axes.

The X- and Y-axes correspond to the physical axis rails 120, 122, respectively, shown on the gantry system illustrated in FIG. 1A. In this example, the Z-axis also corresponds to the up and down motion of the drive box up and down the fixed back plate 124 shown in FIG. 1A and 333 in FIG. 3.

Formal torch axes AC corresponding to the azimuth and rotation of the torch plane correspond to the concepts of longitude and latitude. The mechanical axes are quite different and shown in FIG. 3 as controller internal motor axes V and W.

Figure 4B:
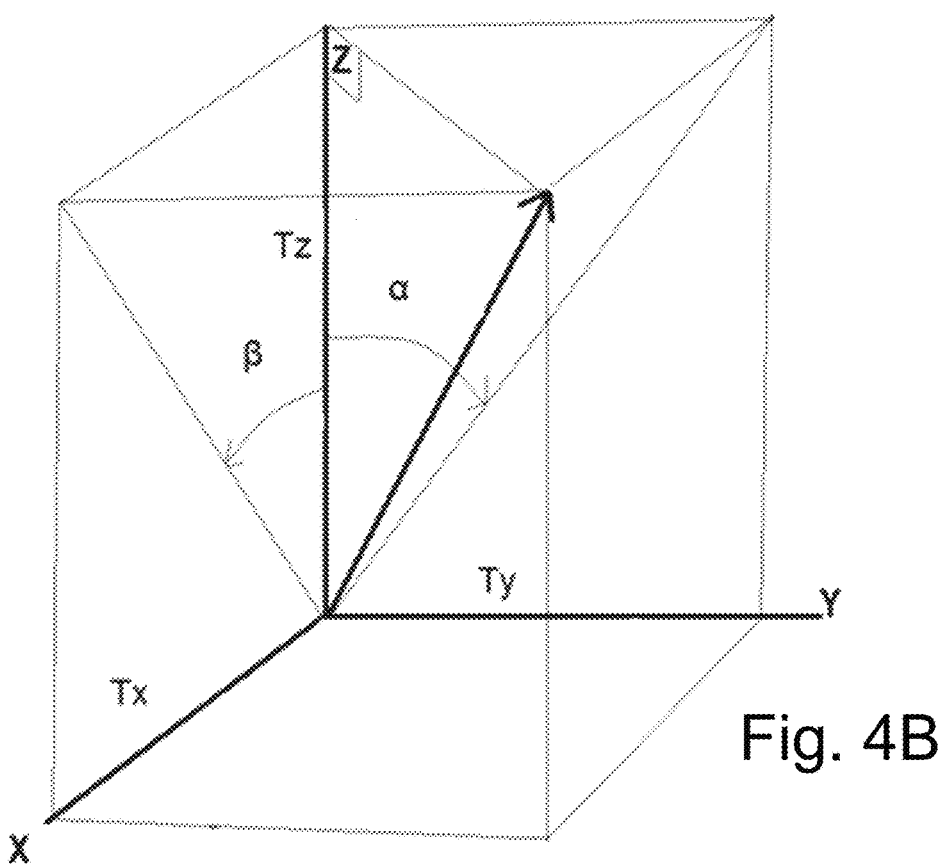
FIG. 4B Shows the axes of the torch as viewed in the axis system of the pantograph arm in terms of tilt angles α or 'twist' in the YZ plane and β or 'tilt' in the XZ plane.

FIG. 4B illustrates the computational axes $\alpha$ and $\beta$ main. The principal axis X is along the main armature of the pantograph and as can be seen from 4 A is tilted $\delta$ degrees below the machine X axis. The axes $\alpha$, $\beta$ closely correspond to the mechanical axes W and V.

The main axis of the pantograph is the X axis. The rotation around the X axis of the pantograph is measured in the YZ plane. The pantograph axes of $\alpha$ and $\beta$ are notional and relate to the pantograph system alone. Axis $\beta$ corresponds to the folding and unfolding of the pantograph and axis $\alpha$ corresponds to the twisting of the main arm of the pantograph. Both axes describe the departure of a vertical plasma torch along the Z axis and a is measured in the XZ plane while $\beta$ is in the YZ plane. These axes XYZ would be identical to the machine axes of FIG. 4A if the tilt of the pantograph $\delta$=0. The tilt is $\delta$=14.0 degrees.

The mechanical axes UV are shown notionally in FIG. 3 but while W is identical to $\alpha$, $\beta$ is calculated through a combination off $\alpha$ and $\beta$ as in equation 2.2.2.1.

Pantograph values $\alpha$ and $\beta$ are themselves calculated from programming axes AC through equations 2.2.2.2.

Figure 4C:
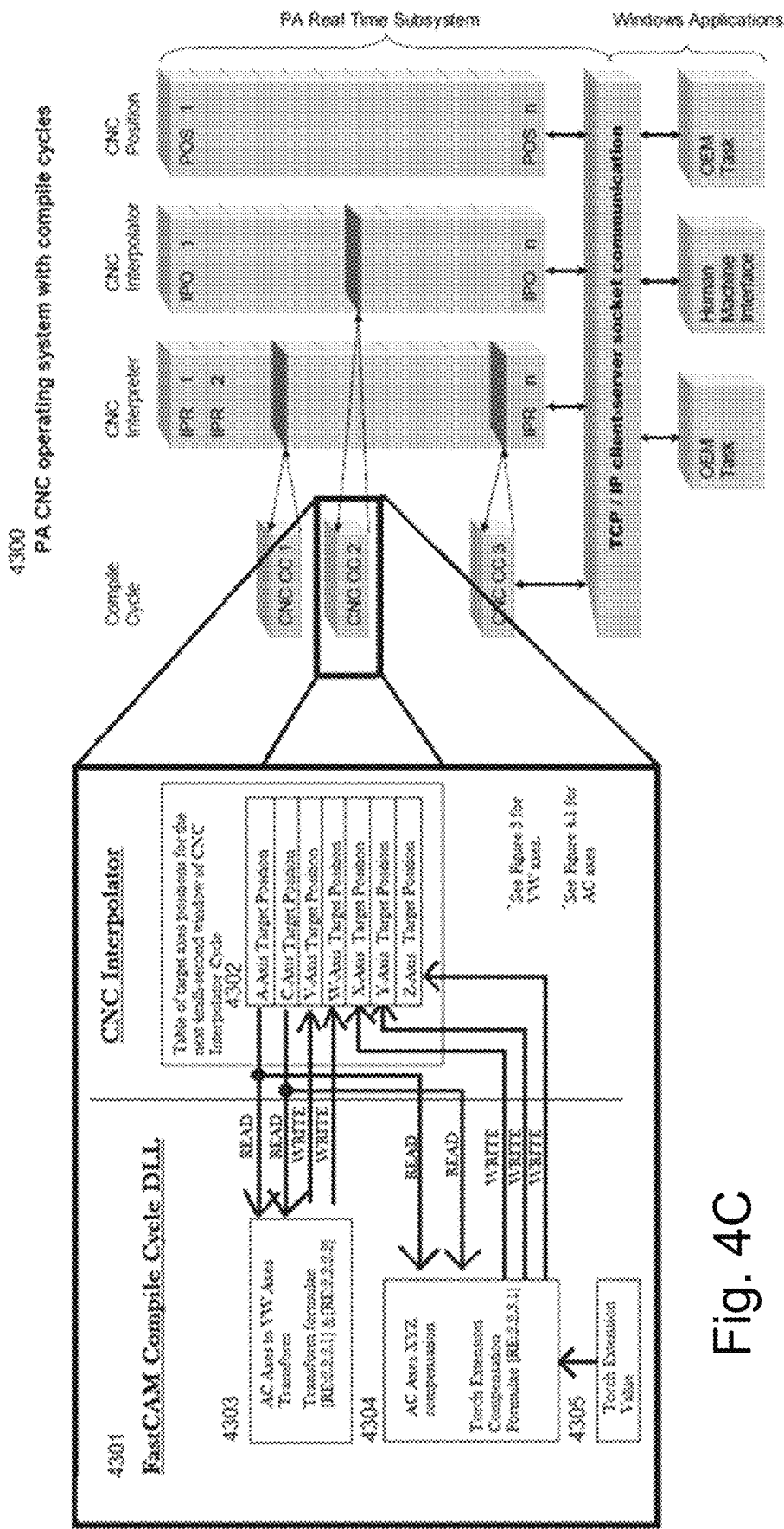
FIG. 4C shows operation of a Power Automation real time system for their proprietary 'Compile Cycles' the system itself being built on a Rockwell real time system to provide a complete programming environment for multi axis programmable machine tools.

FIG. 4C FastCAM Compile Cycle DLL operation in real time. In particular, it shows how programming axes are converted into machine axes and inserted into the real-time system during high speed operation.

Under the Power Automation (PA) open system architecture [4300], the mathematical connections between the axes are programmed inside a .DLL [4301] which is conceptually embedded inside the PA real time system. Power Automation's CNC Interpreter and Interpolator processes will regularly call the compile cycle .DLL program at the beginning of each of their respective cycles.

It all happens very quickly. The CNC Interpolator has a cycle time of only 4 milliseconds. So, every 4 milliseconds it will execute codes inside the DLL along with other tasks.

In each cycle, FastCAM compile cycle DLL will perform the following:

Read data from CNC Interpolator's Target Axes positions table.

Perform the AC to VW Transformation (Equations 2.2.2.1 & 2.2.2.2) takes the A axis and C Axis target position to calculate the corresponding V and W axis target positions. It then writes the calculated desired V and W positions back to the CNC Interpolator table where the motion control takes this as an objective for these mechanical axes. See also FIG. 3 and FIG. 4A and associated text to further understand A, C, V, W Axes.

ACXYZ Torch Extension Compensation takes the A axis and C Axis target positions, as well as the Torch Extension Value [4305] in the DLL to calculate the additional compensations to the final XYZ axes positions required to keep the cutting torch tip at a desired XYZ position. (Ref: equation 2.2.3.1) given that the torch has been extended past the focal point by the extension value (4305). See as well FIG. 3 for further understanding of Torch Extension. The value of the torch extension is the difference in millimeters along the torch central axis between positions 310 and 325.

FIG. 5A illustrates an exemplary H beam being cut on the right-hand side by the system of Patent Application 2014/0236339. It illustrates particularly the clearance distance 565 as very small despite the extension from plate processing position B and new position A. It also illustrates that the beam must be supported a distance 560 sufficiently for the torch tip at A to cut to the bottom of the right-hand flange.

This figure illustrates the need to update, and narrow, the entire drivebox in 530 (FIG. 2).

FIG. 5B illustrates an exemplary H beam showing the beam 500 being cut by a vertical plasma torch having tip 503 and body 503A.

FIG. 5C further illustrates the embodiment of FIG. 5A, seen from the left side of beam 500, and having clearances 550, 560 from the plate 575 and clearance 565 from the beam 500.

Figure 5D:
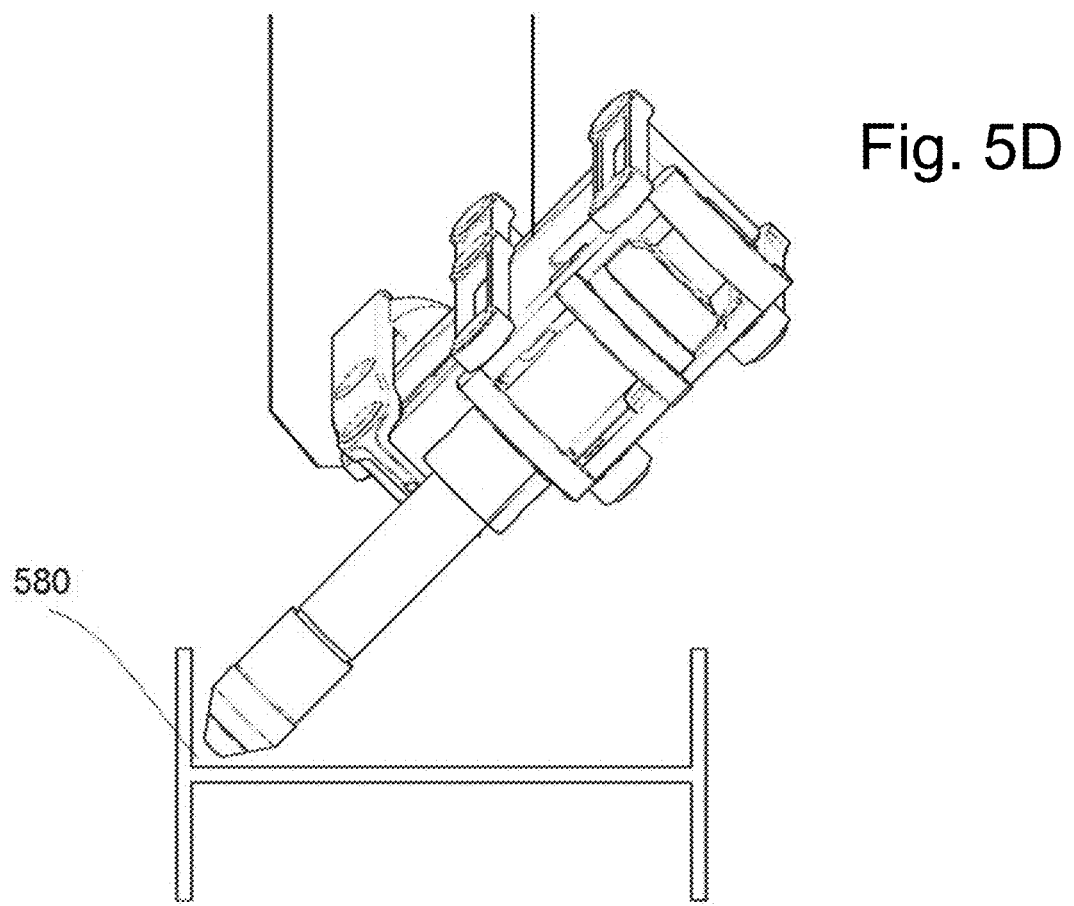
FIG. 5D illustrates cutting at the joint between the web and a flange and illustrates the difficulty of close approach necessary for plasma cutting. It illustrates that the plasma tip cone must have an angle of 90 degrees or less to cut into the corner as the plasma has an operating range of only 5-12 mm from the surface.

FIG. 5D further illustrates an example of web cutting at a join between the web (i.e., element 205, FIG. 2) and the flange (i.e., element 210, FIG. 2), in an embodiment. A torch tilt of 45 degrees is illustrated in this example.

Figure 6:
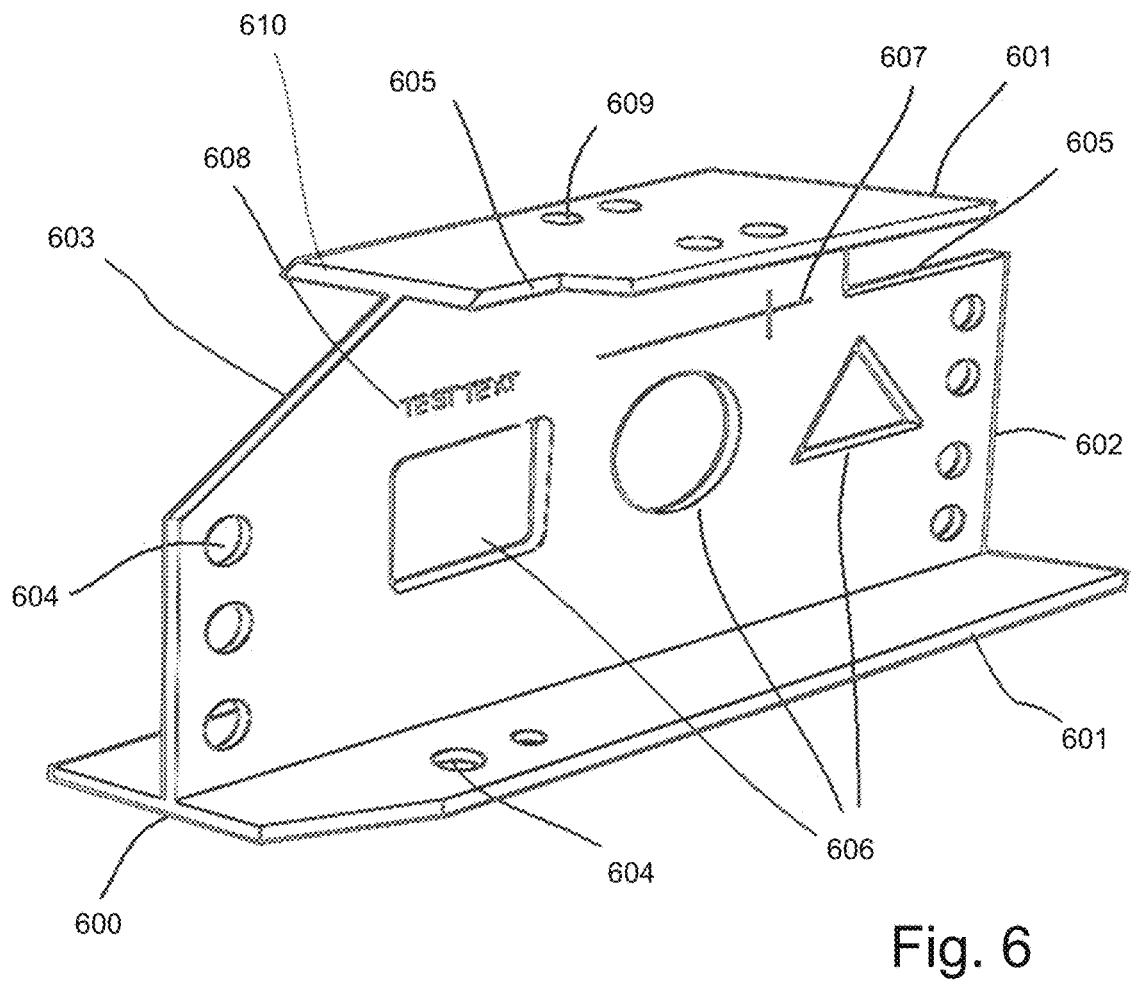
FIG. 6 illustrates an example of a test sample product showing the many processes which can be executed using a plasma torch including drilling, general cutting, line marking, text marking, beveling, coping.

FIG. 6 illustrates an example of a test sample product showing the many processes which can be executed using a plasma torch according to the present embodiments, including cutting, line marking as well as deep grooving for text which can survive painting, comparable to the traditional hard stamping of older machines.

In this example, elements 604 represent circular bolt holes ideally of adequate roundness and smoothness. There is no known standard for taper but as the taper is under 4 degrees on relatively thin material it is not of any consequence. The standard does reject holes which have roughness over $\frac{1}{16}^{th}$ inch but the melting process of the plasma covers that and if the torch does not leave a mark on entry or exit, the holes will be acceptable. This is more about abrasion as in principle the load is carried entirely by the fully tensioned bolt and washers and not by the side of the bolt.

So, holes 604 must be smooth and straight, within tolerances, for practical use in the field of art. General cutouts or penetrations 606, on the other hand are arbitrary shapes in the beam, and which may be placed for making a standard beam lighter, and/or to allow other pipes, beams, or plumbing to penetrate the beam, often without touching the beam.

When assembling a bolted beam structure, welding is common, but most cutting is simply to avoid contact between adjacent beams. Two classes of such cuts are illustrated in FIG. 6, as miters or saw cuts, as indicated by elements 603 and the continuation of angle of cut of the flanges at 610. A more complex cut, which would be impossible to accomplish with a saw, is known as a cope, and illustrated as element 605. Copes are conventionally performed by oxy torches in a traditional beamline.

According to the present embodiments, however, a plasma torch can also line mark the beam 600, a low amperage plasma using Argon which leaves only a surface mark or scratch, as shown by element 607, and/or mark the beam 600 with lettering 608 to identify or instruct in assembly. Additionally, a plasma torch utilized according to the present systems and methods with more power is also capable of gouging the beam 600 to produce a deeper mark in the surface, which may be desirable similarly to elements 607 and 608, but will still be visible even after the beam 600 is painted.

According to the present embodiments, a plasma torch can be used to perform all of the drilling, penetration, sawing, coping, mitering, and cutoff functions of conventional full-functioned universal beamline machines and systems, but with significantly better flexibility, lower expense, and lower weight than such conventional machines. Systems and methods according to the present embodiments are further capable of producing line marks text on long products, which conventionally must be performed by separate hard stamping.

Many other operations may be performed according to the present embodiments, which not shown in FIG. 6, which is provided for illustrative purposes, and is not intended to be exhaustive. For example, slots, tapered holes, square holes for coach bolts, spot marks, and many other geometric shapes may also be achieved according to the present application. Text may also be left on the beam 600 in languages other than English.

Figure 7:
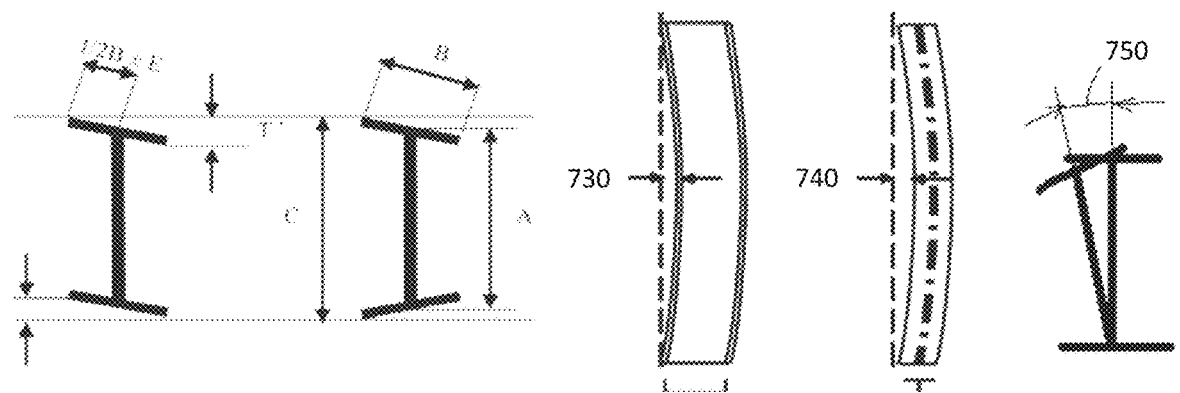
FIG. 7 illustrates variations that are normally found in the shape of hot rolled extruded H or I beams which make NC programming so fundamentally different to plate processing.

FIG. 7 illustrates normal variations in the shape of I beams that are delivered prior to processing including twist, tilt, camber and thickness. As illustrated, the two left-most examples illustrate twists of the flanges relative to a vertical web Example 730 illustrates a camber (web view) and example 740 illustrates a sweep (top or flange view).

Example 750 illustrates a case where a twist in the web can travel down the length of the beam. In addition to these examples, long products are also known in the field to be delivered, prior to processing, with significant variations in width, height and twist, with all sections of the long product potentially having variations in thickness as well. This is notwithstanding distortions, bends and deformations which occur during handling.

Such variations are typically tiny and can be measured in millimeters. Twist and camber down the length of the beam at approximately $\frac{1}{500}$ to $\frac{1}{1000}$ of product length is quite acceptable and hardly noticeable. Such dimensions may not seem significant at first glance, until it is considered that, for a 10-meter beam (which can be common in the field), such variations may add up to 10 mm (1 cm) over the product length. When cutting with a plasma torch this means the torch is off position by 10 mm which can either mean a damaging collision with the beam, or that the torch is so far away it does not work. This historically was a slightly smaller problem with drills which were much longer than needed.

Additionally, all the potential dimensional variations may occur in a single product, thereby adding up to even more significant problems over the product length that would not be significant for conventional NC operation of plate material alone. An NC program, even after creation, must still allow for correction of actual measured distances. Reference points in the material should be chosen according to the use to which the holes are to be put. Unlike all other metal processing, holes always reference edges in the material as the cross section is built for purpose but variable.

For example, if the flanges of a beam are to form a floor in a building, it is necessary to specify bolt hole distances from the top flange. Conversely, if a bottom flange is to form a flat roof, hole positions must be referenced to the bottom flange. For column formation, the center of the beam will be used despite variations in width. The position of the center of the beam or web is determined in each case by measurement across the beam at that point along the beam.

When assembling bolted structures, the distance between bolt holes is critical, since the beams themselves generally do not touch each other. The clearance features such as copes and miters are not significant in assembly as they only prevent collision between beams and other beams or columns. Hole patterns however must be exactly located relative to a datum which varies according to the use of the beam.

Such examples are not intended to be exhaustive, but the examples to provide illustrative explanation of how fixed NC programs, as typically run used a gantry NC plasma cutter, will not be adaptable to beam processing. Beams are almost never perfect in all dimensions as presented to processing.

In structural applications, apart from the bolt holes, miters, copes, cutouts, and end cuts described above, the actual cut shapes are not as critical for dimensioning tolerances as are the edges of the beams, their relative positions and thickness.

Unlike a robotic beam processor using a fixed work cell and moving beam, the universal systems and methods of the present embodiments can also act as a full-size plate processor, including multi pass weld preparation, as well as cut and drill beams; this may significantly change the degree of automation available in structural steel construction, as thus reduce the cost and speed of building, worldwide.

Figure 8:
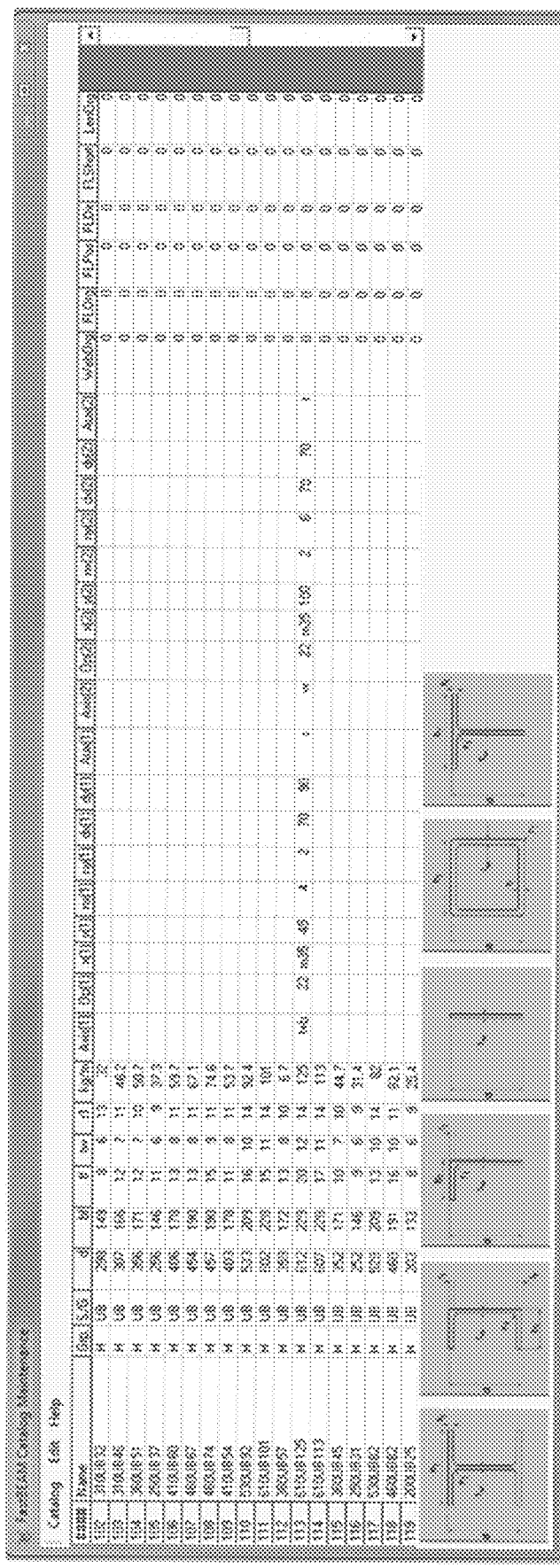
FIG. 8 illustrates a page of a single catalog of beam definitions. Such catalogs are necessary to find the nominal dimensions of a given beam. However, from mill to mill and beam to beam and even within one beam, these dimensions can change enough to be significant as hole patterns are always measured from edges.

FIG. 8 illustrates a page of a sample catalog of beam shapes which must be available to create the NC program internally. The incoming file (say DSTV or .FBV) must specify by name the catalog item which is to be cut. This catalog gives the ideal dimensions and thicknesses of the beam profile parametrically. This information must be combined with the measured profiles at many points to create the NC program for cutting any specific beam presented.

FIG. 9A shows the parametric description of a length of H beam known in the catalog as 360 mm high Universal Beam of weight 51 kg/meter or in this catalog as a 360UB51.

FIG. 9B shows the parametric description of a length of Unequal angle known in the catalog as 125X75X6UA where the legs are 125 mm, 75 mm and the thickness is 6 mm.

FIG. 9C shows the parametric description of a length of Rectangular Hollow Section known in the catalog as 100X100X9RHS which means a 100-mm x 100 mm section with a 9-mm thickness.

FIG. 10A shows schematically the taking of laser scans across a H beam perpendicular to the long axis of the bed at hundreds of points. In the figure this is shown at three distances down the length of the beam aligned with the X axis.

FIG. 10B is a bird's eye view of the same process, showing all 11 cross sections deemed necessary. 11 sections were chosen as appropriate for the expected beam lengths and the legal maximum bend acceptable in the standards.

FIG. 11A shows the results of the examining hundreds of individual YZ points measured vertically down by a laser 301 (FIG. 3) pointing down from the bevel drive box. As in U.S. Pat. No. 9,539,664, in an embodiment, this laser measures distance between the bottom of the bevel box and the surface directly below however, in this case there is not one surface under the drive box but several surfaces. For a H beam there are 8 separate surfaces and 4 edges and 4 joins. Not all can be seen. Three surfaces can be cut in one pass. To do this accurately, points 1101 through 1109 are established in each scan, these points represent surfaces and edges of the long product.

FIG. 11B shows the idealized points needed for determining an H-beam's actual shape, 1111 through 1119, including far flange toe 1111, far flange midpoint 1112, far flange top 1113, far web top surface 1114, web top surface centerpoint 1115, web near top surface 1116, near flange top 1117, near flange midpoint 1118, and near flange toe 1119. Combining these extracted points with the actual points is required to cut or drill accurately at or near this X value along the beam.

Figure 12:
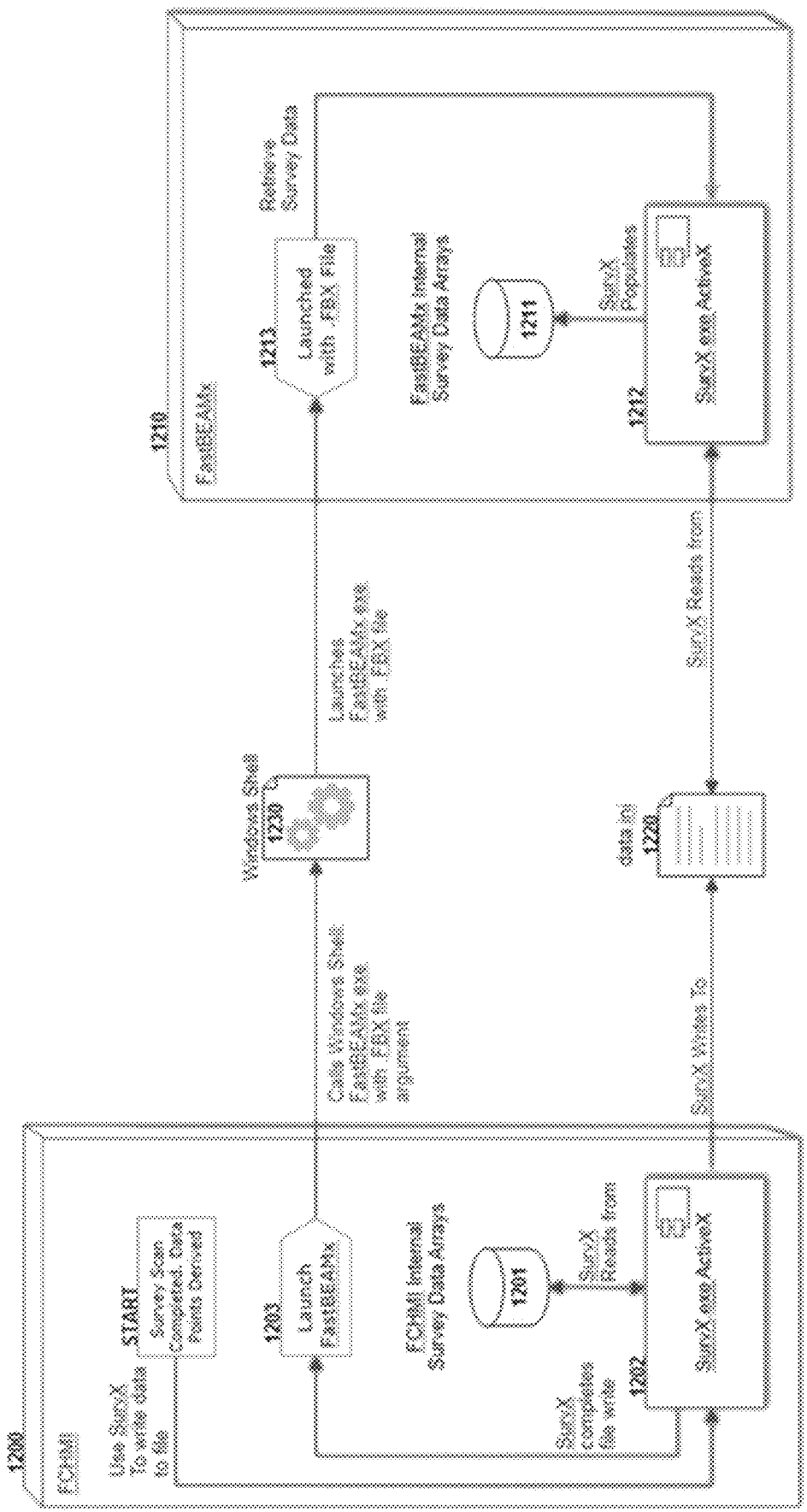
FIG. 12. This flowchart shows the initiation and execution of the 11 scans and the conversion into critical points for defining the long-product surfaces involved. The ultimate survey points derived from the scans are stored in file 1220 "data.ini" for use by the embedded copy of FastBEAM™ known as FastBEAM-X.

FIG. 12 shows the sequence of initiating the 11 scans across the beam, collecting the data, smoothing the data and creating the 11 survey slices with the required parameters of each section of the beam. All these are in block 1200.

FCHMI is the FastCAM Human Machine Interface. The operator initiates the scan through the Human Machine Interface. This software conducts the 11 survey scans and collects the results. The survey is the first step.

After the survey is complete the final points are passed from the FCHMI to FastBEAMx via an ActiveX engine, SurvX.exe which writes the points to a file. Later another instance of SurvX.exe is used by FastBEAM-X to read and interpret the same data.

FastBEAMx is the software which generates the final NC code for the specific beam from three sources, including the laser scan results, the ideal shape of the long product, and the desired locations of holes relative to sides and ends of the long product.

The file data.ini (1220) connects scan system 1200 to NC system FastBEAMx (1210) and each uses its own instance of SurvX.exe to read and write the data.ini (1220) file.

Each Instance of Survey Data Transfer:
The sequence to generate NC code is:
1. Start the laser-scan survey.
2. When the scan completes, we have the Data Points calculated and stored in memory of FastCAM Human Machine Interface Software (FCHMI).
3. FCHMI (1200) initializes a write function using an instance of SurvX.exe (1202)—an activeX engine—to write out the FCHMI Internal Survey data arrays (1201) into a file data.ini (1220), according to the format in SurvX.exe
4. FCHMI starts/launches program FastBEAMx (1210) via passing a specific command line to Window Shell. (1230)
5. FastBEAMx when it is launched, firstly retrieves data and fill its Internal Survey Data arrays (1211) by using a read function from its instance of SurvX.exe (1212) to read from the same data.ini file (1220)
6. The survey data is thus transferred from FCHMI to FastBEAMx. FastBEAMx is ready to proceed to its next task of making CNC files according to the survey data, the ideal shape of the long product, and a file containing locations of holes, penetrations, miters, and copes relative to ends and sides of the long product.
    FastBEAMx must determine all the reference data this specific beam and calculate the precise position of holes, slots, penetrations, cutoff, marking and copes. The final NC program generated is then specific to this beam in this location at this time.

FIG. 13 is another view of the entire process including the routines detailed in FIG. 12.

There are three distinct files which are needed to generate NC data

1. The original .DSTV or .FBV file which contains the work to be done on the beam in a parametric form for an ideal beam.

2. A catalog which defines the nominal shape and sizes to be expected for an ideal cross section of the beam to be cut. This is needed as the reference points differ for each shape as seen from FIGS. 9A, 9B, 9C. This also enables the machine to determine if the shape presented is within tolerance of the shape expected, if a different shape is found an error is generated.

3. The Data.ini created in FIG. 12 which contains the shape defining critical points as determined by the laser survey The combination of the ideal dimensions from the catalog (1305) are compared the real dimensions at each of 11 cross sectional surveys to establish the surfaces which form the H beam at all points between and including the measured 11 slices.

This 3D multi surface model (as distinct from the single surface model of U.S. Pat. No. 9,539,664) is then combined with the desired parametric definition of the desired processing to create the CNC program to process the beam.

This is the process of specifying a part we need cut even from a paper drawing all the way to generating the required CNC file that will instruct the cutting machine to make the correct cuts.

Beginning 1301 perhaps from a drawing of the part use 1302 the desktop FastBEAM software to construct a model of the part and save it as an .FBX file. This is a proprietary parametric beam file format specifically created for beam processing. German industry standard DSTV files may also be imported and then converted to .FBX files. At the machine the stock material is placed 1303 on the bed and the operator selects 1304 the FBX file for processing and specifies 1306 a start origin point to start a survey scan according to the material to be cut.

The FBX file includes parametric data for the cutting including the nominal description of the beam. We can then interrogate FastBEAM Catalog file (1305) and extract the product material's ideal dimensions to assist in conducting the Product Survey. Each Product Survey looks for different shape specific control points as in FIG. 11B.

4. (1307)—Survey Scan with the vertical Laser Range finder on the product material is carried out. In the scan we continually save the machine's XYZ co-ordinates and distance to the beam as data points. There are of course bad points, missing points and zero points, which is part of the smoothing process not detailed here. At the end of a single survey scan across the material, we have a large collection of (X, Y, Z, LASERREADING) data points, the data points representing surfaces and edges of the long product.

5. (1308), (1309)—Using developed software algorithms to clean, smooth and interpret the large data collection we arrive at a small set of (X, Y, Z) points to represent the co-ordinates of the top surface of the product material and the control points of FIG. 11B.

6. (1310)—Apply the processing requests to the precise shape as determined from all the survey. These are naturally in the coordinates of the cutting machine. In effect the cutting machine now knows precisely where the real part is located on the cutting bed and its exact shape.

7. (1313)—with the exact shape of all surface of the scanned beam, the desired processing is calculated in the coordinates and passes for the actual beam on the machine. Allowance for cutting width or kerf must be made. Also, circles are no longer available as a movement function, so all arcs and circles must be cut as small movements in XYZAC.

So, a CNC file is then generated ready for the cutting machine controller to process and cut the specific beam as required. The individual cutting or marking passes are created as streams of movements which consist of XYZAC blocks in absolute coordinates. The torch is kept a fixed distance from the beam surface without height controls of any sort. All scanning and processing occurs without touching the beam.

Figure 14:
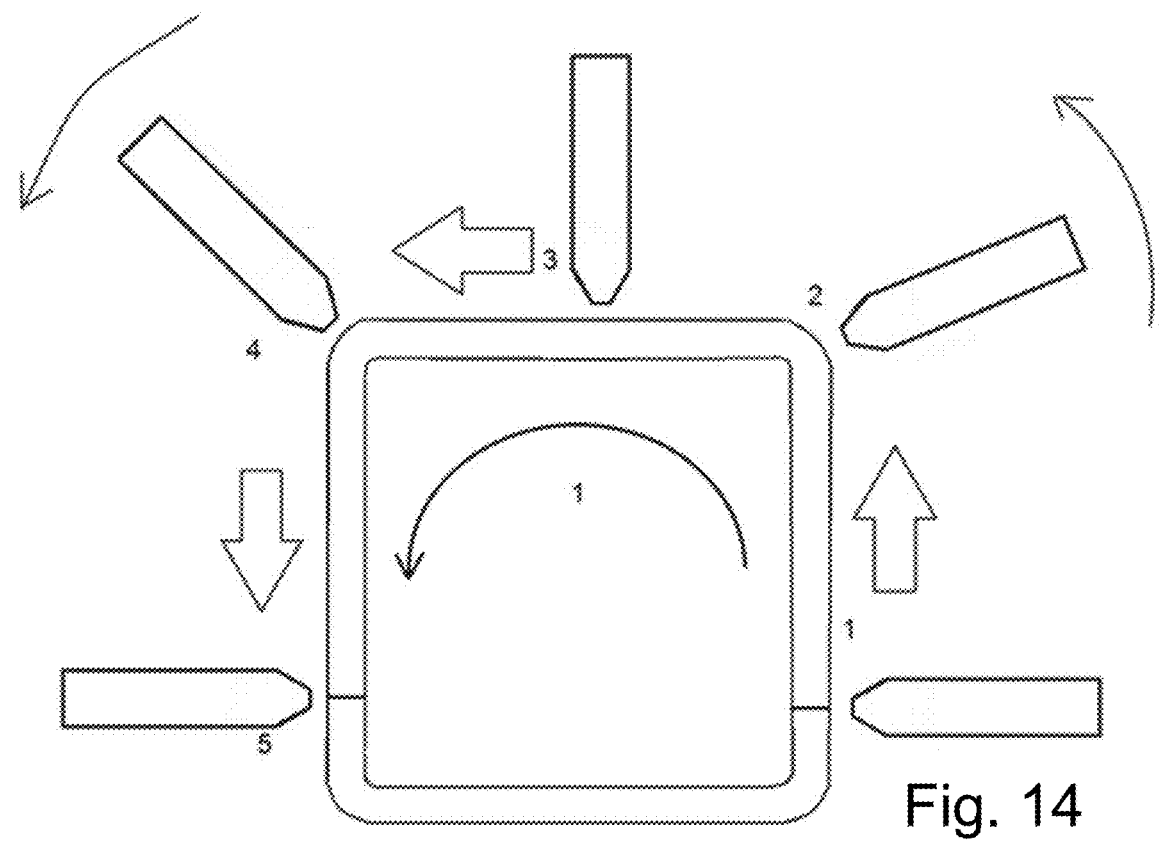
FIG. 14 illustrates a method of cutting a Rectangular Hollow Section with a first cutting pass and a second or flip cutting pass.

FIG. 14 shows an exemplary way to cutting or sawing an exemplary closed product, in this case Square Hollow Section (SHS). The first pass is from 1401 to 1402 to 1403 to 1404 to 1405 in a single smooth pass in the YZ plane maintaining the torch square to the cut surface. The corners are particularly challenging as they require synchronous movements in YZAC. They also require movements in X if the beam is not aligned with the X axis of the machine. In this case the beam is flipped and the final section 1406 is cut.

Figure 15:
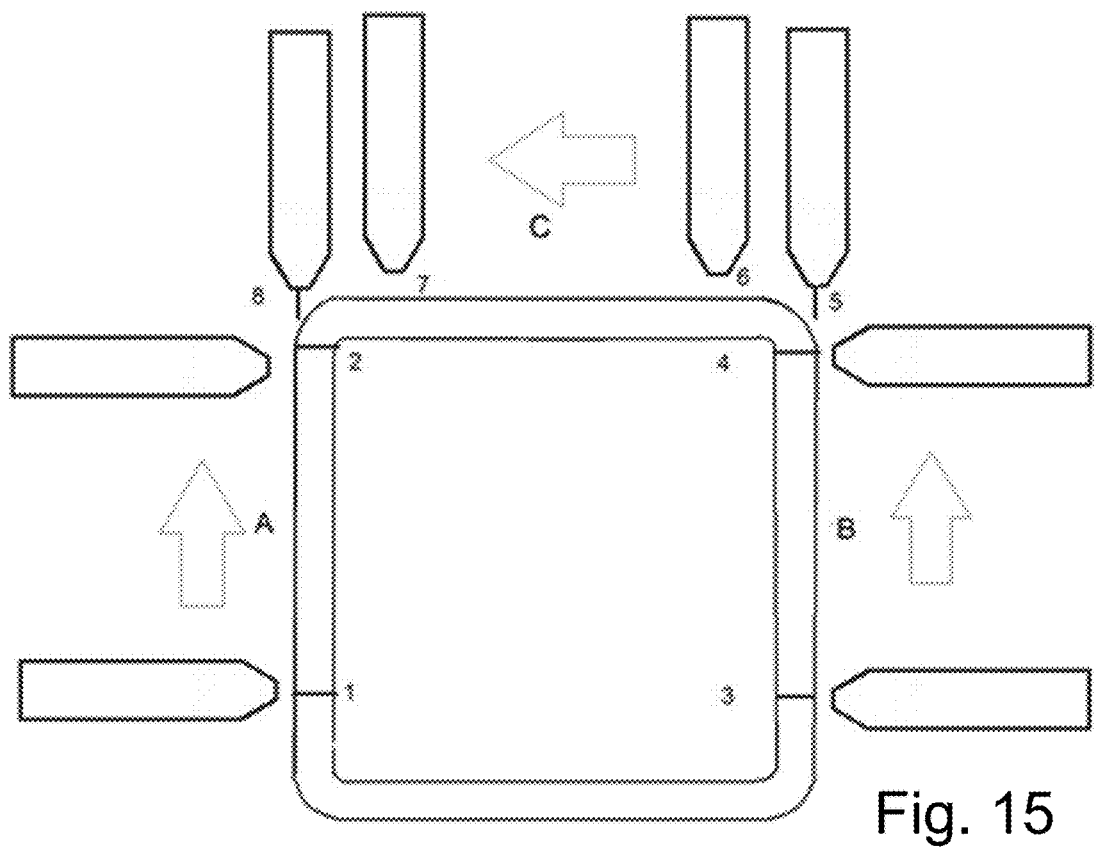
FIG. 15 illustrates an alternative method of cutting a Rectangular Hollow Section using three top cutting passes and a single flip cutting pass after the section is flipped 180-degrees.

FIG. 15 shows an alternative way of cutting the same shape. In this case there are four simpler cutting passes. The first is A from 1 to 2. The second is B from 3 to 4. The third is a top cut from 5 to 8.

Then the part is flipped and the final cut bottom cut is from 1 to 3. The difference with the sequence in FIG. 14 has to do with complexity, quality of cut, thickness of the material and induced movement. It has been found by experience that FIG. 15 sequence cutting may reduce unwanted thermal movement in unrestrained beams. FIG. 15 though requires two pierces of the beam at 1 & 2 where approach 14 requires only one pierce.

FIG. 16 shows an illustrative and successful three pass cut of a heavy length or train or tram rail. This example was added to the catalog for this purpose, even though it does not exist normally in a structural steel catalog.

In cutting A then B then C there is minimum movement and the part is completely and quickly severed in the order of a minute. Note that in this case the torch must tilt substantially past horizontal.

This section illustrates that the invention can be used for a large range of 'Long Products' which include but a are not limited to structural products or beams.

FIG. 17 is an exaggerated view of a bent or cambered beam lying on the bed unrestrained and not aligned carefully with the major X axis. It shows the 11 slices. In principle the FastBEAM-x program compensates for both the misalignment α of the beam with the X axis and the amount of bend or camber in the beam. ψ (not shown). This level of sophistication is not obvious but essential for unrestrained product placed on the machine for processing. While not elaborating how the individual surfaces are calculated this allows great flexibility in handling complex situations and substantially deformed product. However as previously noted, bends over about 100 mm down a length are not considered accurate enough to be processed, if the bend is not intentional. Such beams need to be straightened first to ensure accuracy of hole positions.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A gantry-type plasma-torch cutting machine comprising:
   a gantry configured to move along a bed in a first (X) axis;
   a plasma torch coupled through a pantograph to a drive box, the drive box coupled to a backing plate configured to move along the gantry in a second (Y) axis perpendicular to the first (X) axis;
   the drive box configured to rotate the plasma torch about a third axis, the third axis being an axis of rotation, and to operate the pantograph to tilt the plasma torch about a fourth axis, the fourth axis being an axis of tilt perpendicular to the third axis;
   the drive box being configured to move along the backing plate in a fifth (Z) axis perpendicular to the first and second axis, the fifth axis being vertical;
   a controller coupled to control movement of the gantry in the first (X) axis, movement of the backing plate along the gantry in the second (Y) axis, movement of the drive box along the backing plate in the fifth (Z) axis, rotation of the plasma torch in the third axis and tilt of the plasma torch in the fourth axis;
   a laser scanner mounted to the drive box and configured to measure a height of a long product;
   wherein the plasma torch is adapted to be mounted in the pantograph in a first position with a tip of the plasma torch beyond a focal point defined by an intersection of the third axis and a central axis of the plasma torch;
   wherein the controller comprises a processor configured to use floating point arithmetic to, when the plasma torch is mounted in the first position, compute and apply offsets in the first, second and fifth axes as required to maintain the tip of the plasma torch in a desired position despite the plasma torch being rotated in the third axis, and the plasma torch being tilted in the fourth axis; and
   the processor configured to compute the offsets in the first (X), second (Y) and fifth (Z) axes as the plasma torch is rotated in the third axis and tilted in the fourth axis.

2. The gantry-type plasma-torch cutting machine of claim 1 wherein the torch is adapted to be mounted in the pantograph in a second position with the tip of the plasma torch at the focal point of the pantograph in addition to being adapted to be mounted in the first position.

3. The gantry-type plasma-torch cutting machine of claim 2 wherein the drive box is adapted to rotate the plasma torch to angles of − and +90 degrees from vertical.

4. The gantry-type plasma-torch cutting machine of claim 3 wherein the drive box is adapted to operate the pantograph to tilt the plasma torch in the fourth axis 45 degrees from vertical.

5. The gantry-type plasma-torch cutting machine of claim 1 wherein the laser scanner is adapted to scan the long product to prepare scans across the long product and the controller is configured to prepare an electronic map of surfaces and edges of long product from the scans across the long product.

6. The gantry-type plasma-torch cutting machine of claim 5 wherein the controller is configured by firmware to determine if the long product matches a desired long product using the electronic map of surfaces and edges of the long product.

7. A gantry-type plasma-torch cutting machine comprising:
   a gantry configured to move along a bed in a first (X) axis;
   a plasma torch coupled through a pantograph to a drive box, the drive box coupled to a backing plate configured to move along the gantry in a second axis perpendicular to the first (X) axis;
   the drive box configured to rotate the plasma torch about a third axis, the third axis being an axis of rotation, and to operate the pantograph to tilt the plasma torch about a fourth axis, the fourth axis being an axis of tilt perpendicular to the third axis;
   the drive box being configured to move along the backing plate in a fifth axis perpendicular to the first and second axis, the fifth axis being vertical;
   a controller coupled to control movement of the gantry in the first (X) axis, movement of the backing plate along the gantry in the second axis, movement of the drive box along the backing plate in the fifth axis, rotation of the plasma torch in the third axis and tilt of the plasma torch in the fourth axis;
   wherein the plasma torch is adapted to be mounted in the pantograph in a first position with a tip of the plasma torch beyond a focal point defined by an intersection of the third axis and a central axis of the plasma torch;
   wherein the controller comprises a processor configured to use floating point arithmetic to, when the plasma torch is mounted in the first position, compute and apply offsets in the first (X), second (Y) and fifth (Z) axes as required to maintain the tip of the plasma torch in a desired position despite rotation of the plasma torch in the third axis, and tilt of the plasma torch in the fourth axis; and
   the processor configured to compute the offsets in the first (X), second (Y) and fifth (Z) axes as the plasma torch is rotated in the third axis and tilted in the fourth axis;
   the gantry-type plasma-torch cutting machine comprising a laser scanner adapted to scan the long product to prepare scans across the long product and the controller is configured to prepare an electronic map of surfaces and edges of long product from the scans across the long product;
   wherein the laser scanner is mounted to the drive box and is configured to measure a height of the long product.

8. The gantry-type plasma-torch cutting machine of claim 7 wherein the controller is configured to scan the drive box across a bed of the cutting machine a plurality of times to locate, and prepare the electronic map of, the surfaces of the long product.

9. The gantry-type plasma-torch cutting machine of claim 7 wherein the long product is an H-beam and the controller comprises firmware configured to prepare a numerical control program to drive movement of the gantry, backing plate, and drive box in the first, second, and fifth axes, to cut the H-beam, the numerical control program based upon the electronic map of surfaces of the long product.

10. The gantry-type plasma-torch cutting machine of claim 9 wherein the controller is configured by firmware to determine locations of penetrations to be formed in the long product from information comprising the electronic map of surfaces of the long product and desired locations of the penetrations relative to ends and sides of the long product.

11. A plasma-torch cutting machine comprising:
   a laser workpiece-mapping system configured to provide measurements of a workpiece to a control processor the measurements including height measurements of the workpiece;
   a gantry movable by command of the control processor along a length of a bed of the plasma-torch cutting machine, movement of the gantry defining an X axis;

a drive-mounting box coupled to and movable under command of the control processor along the gantry, movement of the drive-mounting box along the gantry defining a Y axis;

a plasma cutting torch coupled by a pantograph to the drive-mounting box, the pantograph rotatable about a rotation axis perpendicular to the Y axis and tiltable in a tilt axis perpendicular to the rotation axis, the pantograph configured such that with the plasma cutting torch attached to the pantograph in a first position a tip of the plasma cutting torch remains at a focal point despite rotation of the plasma cutting torch in a rotation axis, and with the plasma cutting torch in the first position the tip of the plasma cutting torch remains at the focal point despite changes of tilt;

the focal point being at an intersection of an axial axis of the plasma cutting torch with the rotation axis;

the pantograph movable under command of the control processor in a Z axis perpendicular to the X and Y axes;

the plasma cutting torch configured to attach to the pantograph in a second position, the second position characterized by the tip of the plasma cutting torch being distal to the focal point and a body of the plasma cutting torch intersecting the focal point;

wherein the control processor is configured to use floating point arithmetic to compute and apply offsets in the X, Y and Z axis as required to maintain the tip of the plasma cutting torch in a desired position despite the torch being mounted in the second position, rotation of the plasma cutting torch in the rotation axis, and tilt of the plasma cutting torch in the tilt axis; and the control processor is configured to compute the offsets as the torch is rotated in the rotation axis and tilted in the tilt axis.

12. The plasma-torch cutting machine of claim 11 wherein the control processor is configured to use a map provided by the laser workpiece-mapping system to determine positions of the tip of the plasma cutting torch for cutting in the X, Y, and Z axes.

* * * * *